United States Patent
Ryu et al.

(10) Patent No.: US 11,825,510 B2
(45) Date of Patent: Nov. 21, 2023

(54) METHOD AND DEVICE FOR TRANSMITTING, BY TERMINAL, UPLINK CONTROL INFORMATION IN COMMUNICATION SYSTEM

(71) Applicant: Samsung Electronics Co., Ltd., Suwon-si (KR)

(72) Inventors: Hyunseok Ryu, Yongin-si (KR); Jaewon Kim, Seoul (KR); Jeehwan Noh, Suwon-si (KR); Hyukmin Son, Hanam-si (KR); Hyunkyu Yu, Suwon-si (KR); Hyunil Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 17/396,205

(22) Filed: Aug. 6, 2021

(65) Prior Publication Data
US 2021/0368520 A1    Nov. 25, 2021

Related U.S. Application Data

(63) Continuation of application No. 16/692,781, filed on Nov. 22, 2019, now Pat. No. 11,089,613, which is a (Continued)

(51) Int. Cl.
*H04W 72/566*  (2023.01)
*H04L 5/00*  (2006.01)
(Continued)

(52) U.S. Cl.
CPC ........ *H04W 72/569* (2023.01); *H04B 7/0632* (2013.01); *H04B 7/0639* (2013.01);
(Continued)

(58) Field of Classification Search
CPC ... H04W 72/569; H04W 72/21; H04W 72/23; H04W 76/27; H04W 88/06; H04W 88/10;
(Continued)

(56) References Cited

U.S. PATENT DOCUMENTS 10,492,213 B2    11/2019   Ryu et al.
10,499,384 B2 *  12/2019   He ..................... H04L 5/0057
(Continued)

FOREIGN PATENT DOCUMENTS

EP       2760172 A2 *  7/2014  ........... H04L 1/0026
KR    10-2013-0083391 A    7/2013
(Continued)

OTHER PUBLICATIONS

Korean Office Action dated Nov. 30, 2020, issued in Korean Application No. 10-2017-0027342.

*Primary Examiner* — Peter G Solinsky
(74) *Attorney, Agent, or Firm* — Jefferson IP Law, LLP

(57) ABSTRACT

Disclosed is a 5G or pre-5G communication system for supporting a data transmission rate higher than that of a 4G communication system such as LTE. According to the present disclosure, a method of a terminal in a wireless communication system comprises the steps of: receiving downlink control information (DCI); confirming whether the DCI is uplink DCI for an uplink or downlink DCI for a downlink; and transmitting, through an uplink control channel or an uplink data channel, uplink control information (UCI) according to the confirmation result.

16 Claims, 15 Drawing Sheets

Related U.S. Application Data continuation of application No. 16/081,296, filed as application No. PCT/KR2017/002287 on Mar. 2, 2017, now Pat. No. 10,492,213.

(60) Provisional application No. 62/312,812, filed on Mar. 24, 2016, provisional application No. 62/302,373, filed on Mar. 2, 2016.

(51) Int. Cl.

| | | |
|---|---|---|
| *H04L 1/1829* | (2023.01) | |
| *H04L 1/1607* | (2023.01) | |
| *H04W 72/21* | (2023.01) | |
| *H04W 72/23* | (2023.01) | |
| *H04W 76/27* | (2018.01) | |
| *H04B 7/06* | (2006.01) | |
| *H04L 1/1812* | (2023.01) | |
| *H04W 88/06* | (2009.01) | |
| *H04W 88/10* | (2009.01) | |
| *H04W 48/12* | (2009.01) | |
| *H04W 24/10* | (2009.01) | |

(52) U.S. Cl.
CPC .......... *H04L 1/1671* (2013.01); *H04L 1/1812* (2013.01); *H04L 1/1861* (2013.01); *H04L 5/0053* (2013.01); *H04L 5/0064* (2013.01); *H04W 72/21* (2023.01); *H04W 72/23* (2023.01); *H04W 76/27* (2018.02); *H04W 88/06* (2013.01); *H04W 88/10* (2013.01); *H04L 5/0048* (2013.01); *H04L 5/0055* (2013.01); *H04W 24/10* (2013.01); *H04W 48/12* (2013.01)

(58) Field of Classification Search
CPC .... H04W 24/10; H04W 48/12; H04B 7/0632; H04B 7/0639; H04L 1/1671; H04L 1/1812; H04L 1/1861; H04L 5/0053; H04L 5/0064; H04L 5/0048; H04L 5/0055
USPC .......................................................... 370/329
See application file for complete search history.

(56) References Cited

U.S. PATENT DOCUMENTS

| | | |
|---|---|---|
| 2010/0271970 A1 | 10/2010 | Pan et al. |
| 2011/0299484 A1 | 12/2011 | Nam et al. |
| 2011/0299500 A1 | 12/2011 | Papasakellariou et al. |
| 2012/0320840 A1 | 12/2012 | Kim et al. |
| 2013/0121274 A1 | 5/2013 | Chen et al. |
| 2014/0071903 A1 | 3/2014 | Sorrentino et al. |
| 2014/0192738 A1 | 7/2014 | Nam et al. |
| 2014/0369242 A1 | 12/2014 | Ng et al. |
| 2015/0043457 A1 | 2/2015 | Liu et al. |
| 2015/0117275 A1 | 4/2015 | Park |
| 2016/0050648 A1 | 2/2016 | Seo et al. |
| 2017/0070979 A1 | 3/2017 | Mirzaee et al. |
| 2017/0170931 A1 | 6/2017 | Kusashima et al. |
| 2019/0222397 A1* | 7/2019 | Ahn .................. H04L 1/18 |

FOREIGN PATENT DOCUMENTS

| | | |
|---|---|---|
| KR | 10-2013-0111939 A | 10/2013 |
| KR | 10-2015-0106398 A | 9/2015 |
| KR | 10-2016-0011182 A | 1/2016 |
| WO | 2011/083990 A2 | 7/2011 |

* cited by examiner

FIG. 1
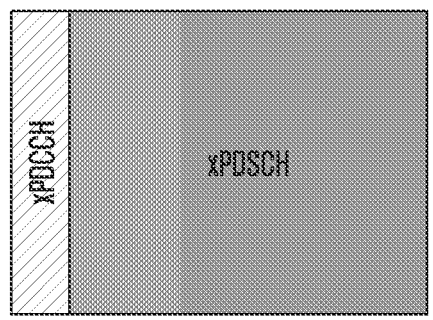
(a)
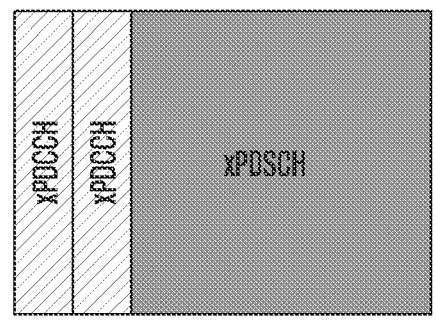
(b)
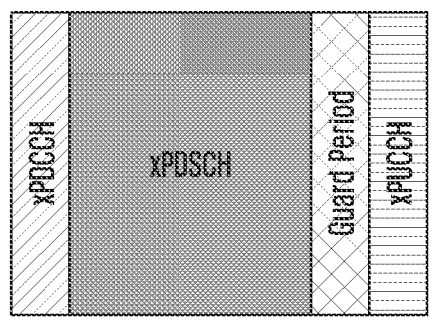
(c)
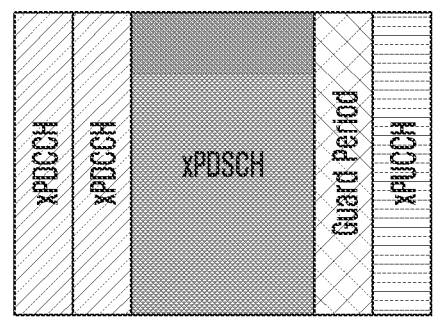
(d)

FIG. 2
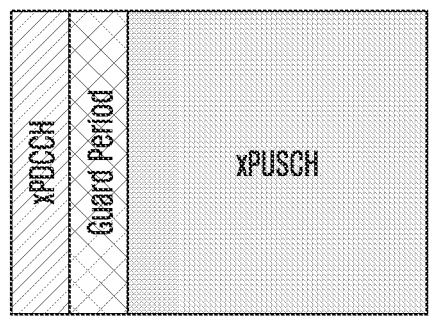
(a)
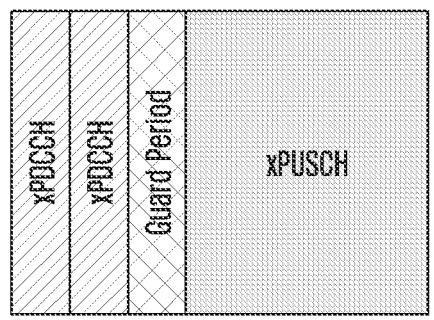
(b)
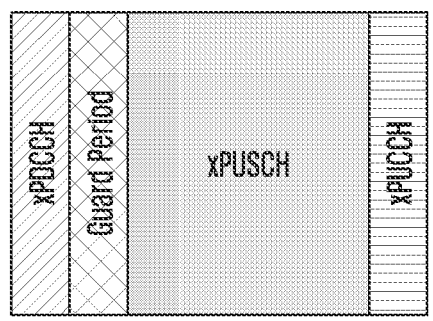
(c)
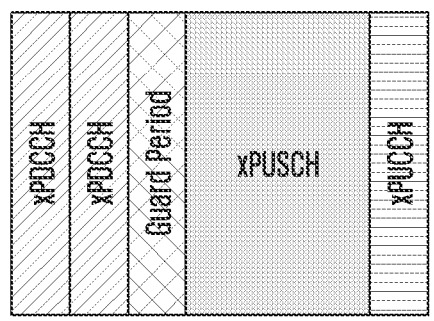
(d)

METHOD AND DEVICE FOR TRANSMITTING, BY TERMINAL, UPLINK CONTROL INFORMATION IN COMMUNICATION SYSTEM

CROSS-REFERENCE TO RELATED APPLICATION(S)

This application is a continuation application of prior application Ser. No. 16/692,781, filed on Aug. 8, 2018, which has issued as U.S. Pat. No. 11,089,613 on Aug. 10, 2021, which is a continuation application of prior application Ser. No. 16/081,296, filed on Aug. 30, 2018, which was a U.S. National Stage application under 35 U.S.C. § 371 of an International application number PCT/KR2017/002287, filed Mar. 2, 2017, and was based on and claimed priority under 35 U.S.C § 119(e) of a U.S. Provisional application 62/302,373, filed on Mar. 2, 2016, and a U.S. Provisional application 62/312,812, filed on Mar. 24, 2016, in the U.S. Patent and Trademark Office, the disclosure of each of which is incorporated by reference herein in its entirety.

TECHNICAL FIELD

Various embodiments of the present disclosure relate to a communication system, and more particularly, to, a method and apparatus for transmitting, by a terminal, uplink control information in a communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Conventionally, in the LTE, the control information that a terminal transmits on an uplink may include at least one of hybrid automatic repeat request (HARQ) ACK/NACK, channel quality (CQI) information, precoding matrix indication (PMI) Information, rank indication (RI) information, and scheduling request SR information The control information may be transmitted on a physical uplink control channel (PUCCH) which is an uplink control channel, or may be transmitted on a physical uplink shared channel (PUSCH), which is an uplink data channel, along with data.

In the related art, downlink control information that a terminal receives from a base station and uplink control information transmitted from the terminal to the base station are transmitted at different transmission time intervals (TTI). For example, the base station transmits the downlink control information to the terminal at an n-th subframe, and the terminal transmits the uplink control information to the base station at a (n+4)-th subframe. For example, the terminal can transmit ACK/NACK information for reception of the downlink control information to the base station in the (n+4)-th subframe.

Also, when the base station receives the NACK in the (n+4)-th subframe, the base station can retransmit data in the (n+K)-th subframe. In this case, a K value is fixed to 8 in the case of a frequency division duplexing (FDD) system and may be changed according to a configuration of a downlink/uplink subframe (DL/UL subframe) in the case of a time division duplexing (TDD) system, but the K value is fixed in a specific configuration.

Such an operation may not satisfy a low communication latency which is one of the requirements of the 5G communication system, and the degree of freedom of a base station scheduler may be limited to reduce flexibility of a base station scheduler.

A self-contained frame structure has been proposed to satisfy these requirements. The sub-frame structure may be used in combination with the term self-contained frame structure, and may mean a frame structure for fast HARQ-ACK (fast HARQ-ACK) support or a frame structure for low delay support. In the frame structure, the configuration of the subframe can be changed dynamically for each subframe. For example, the n-th subframe may be set as downlink data reception, a (n+1)-th subframe may be set as uplink data transmission, a (n+2)-th subframe receives downlink data, and a (n+3)-th subframe may be set as control information transmission. Therefore, it is necessary to design the operation of the terminal and the control channel for transmitting the control information on the uplink in such a frame structure.

In addition, the 5G communication system is considering the use of a super high frequency (mmWave) band (for example, 30 GHz, 60 GHz bands) which may have a wide bandwidth in order to achieve a high data transmission rate. However, in the super high frequency band, the use of technologies such as beamforming has been discussed because a propagation path loss and a propagation transmission distance are short. Therefore, for the beam operation through the beamforming, a method for configuring control information is needed.

DISCLOSURE OF INVENTION

Technical Problem

An object of the present disclosure is directed to provision of a method for configuring control information that a terminal transmits on an uplink and a method for operating a terminal to transmit control information.

Another object of the present disclosure is directed to provision of a method for configuring control information for a beam operation when a technology such as beamforming is applied and a method for operating a terminal for transmitting control information.

Solution to Problem

Various embodiments of the present disclosure are directed to the provision of a method of a terminal in a wireless communication system, the method including: receiving downlink control information (DCI); identifying whether the DCI is an uplink DCI for an uplink or a downlink DCI for a downlink; and transmitting, on an uplink control channel or an uplink data channel, uplink control information (UCI) according to the identification result.

Various embodiments of the present disclosure are directed to the provision of a method of a base station, the method including: generating downlink control information (DCI); transmitting the DCI to a terminal; and receiving uplink control information (UCI) on an uplink control channel or an uplink data channel according to whether the DCI is an uplink DCI for an uplink or a downlink DCI for a downlink.

Various embodiments of the present disclosure are directed to the provision of a terminal including: a transceiver configured to transmit and receive a signal; and a controller configured to receive downlink control information (DCI), identify whether the DCI is an uplink DCI for an uplink or a downlink DCI for a downlink; and transmit, on an uplink control channel or an uplink data channel, uplink control information (UCI) according to the identification result.

Various embodiments of the present disclosure are directed to the provision of a base station including a transceiver configured to transmit and receive a signal; and a controller configured to generate downlink control information (DCI), transmit the DCI to a terminal; and receive uplink control information (UCI) on an uplink control channel or an uplink data channel according to whether the DCI is an uplink DCI for an uplink or a downlink DCI for a downlink.

Advantageous Effects of Invention

According to the embodiment of the present disclosure, the delay time can be reduced when the terminal transmits the uplink control information, and the flexibility of the base station scheduler can be increased.

BRIEF DESCRIPTION OF DRAWINGS

FIG. 1 is a diagram illustrating a frame structure for transmitting downlink data according to the present disclosure.

FIG. 2 is a diagram illustrating a frame structure for transmitting uplink data according to the present disclosure.

MODE FOR THE INVENTION

Figure 3:
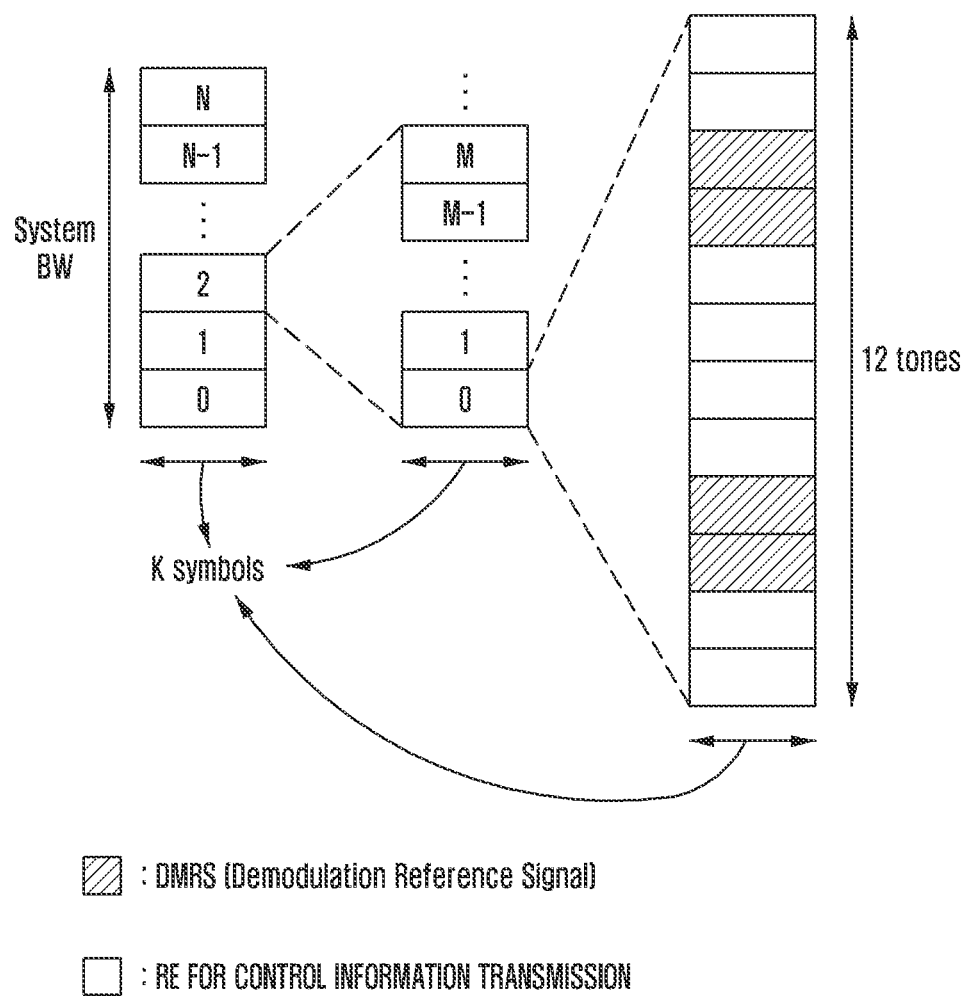
FIG. 3 is a diagram illustrating an uplink control channel for transmitting uplink control information according to an embodiment of the present disclosure.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '-unit' used in the present embodiment means software or hardware components such as FPGA and ASIC and the 'unit' performs any roles. However, the meaning of the 'unit' is not limited to software or hardware. The 'unit' may be configured to be in a storage medium that may be addressed and may also be configured to reproduce one or more processor. Accordingly, for example, the 'unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

Further, in the drawings illustrating a method in embodiments, the order of description does not necessarily correspond to the order of execution, and the order relationship may be changed or executed in parallel.

In addition, the present disclosure describes, by way of example, a case of a wireless communication system for convenience of explanation, but the content of the present disclosure may also be applied to a wired communication system.

The present disclosure includes a method for configuring control information transmitted from a terminal on an uplink in a 5G communication system. Further, a method and a device for operating a terminal for transmitting control information on an uplink.

More specifically, in the present disclosure, the uplink control information may include at least one of the following information:

HARQ-ACK/NACK: ACK/NACK feedback information on downlink data information transmitted from the base station to the terminal;

CQI: Feedback information on downlink channel quality information measured by the terminal;

PMI: Feedback information on downlink precoding matrix information measured by the terminal;

RI: Feedback information on downlink rank information measured by the terminal; or Beam Measurement Information: It may include a beam index (BI) of the downlink beam measured by the terminal and downlink beam quality information (BQI) measured by the terminal.

The base station may periodically transmit a beam measurement reference signal (BRS) to acquire the beam information (BI, BQI) from the terminal.

The terminal may measure BRS transmitted from the base station and feed back the BQI to the base station, along with the BI of the beam having the best quality. At this point, the BQI is measured using the BRS, and may be defined as received signal strength of a desired beam (BRSRP), and a ratio of received signal strength of a desired beam and received signal strength of an interference beam, etc.

The information measured using the BRS may be referred to as beam status information (BSI).

Meanwhile, the terminal may measure the BRSs transmitted from the base station and then align the BRSs in order of magnitude, and feedback N BIs and BQIs corresponding to each BI according to an instruction of the base station (for example, N=1, 2, ... ).

The information on N can be referred to as feedback number information, and can be applied to all terminals of cells that the base station serves based on the system information.

As another example of signaling of the feedback number information (information on N), the base station may notify the terminal of the information on the N based on UE-specific RRC signaling or the downlink control information (DCI) which is transmitted through a downlink control channel. In this case, the downlink control information may include the DCI (hereinafter, referred to as UL DCI) for the uplink and the DCI (hereinafter, referred to as a DL DCI) for the downlink, and the information on the N may be included in the DCI.

As described above, the base station may notify the terminal of the information on the N, and the base station may feed back with different numbers of beam information for each terminal. For example, a terminal A may be set as N=1 from the base station, and the terminal A can feed back the best one beam (the beam having the largest received signal strength of the beam) to the base station. In addition, a terminal B may be set as N=2 from the base station, and the terminal B may feedback the two best beams to the base station.

Meanwhile, if the number of beams to be operated by the base station is too large, the terminal may take a long time to acquire the beam information. In this case, the base station may operate a reference signal for additional beam measurement. For example, when the number of beams to be operated by the base station is 200, the base station periodically transmits (for example, 100) BRSs capable of representing some of 200 beams to enable the terminal to coarsely acquire the beam information (coarse beam acquisition) and transmits an additional beam refinement reference signal (BRRS) to enable the terminal to accurately acquire the beam information (fine beam acquisition). That is, the terminal may acquire the best beam information in one-shot using only the BRS or acquire the best beam information by a two-step method of the BRS and the BRRS.

The uplink control information (UCI) may be transmitted on a separate uplink control channel (xPhysical uplink control channel (xPUCCH)) or may be transmitted on an uplink data channel (xPhysical uplink shared channel (xPUSCH)), along with data. The xPUCCH and the xPUSCH of the present disclosure refer to an uplink control channel and an uplink data channel of an arbitrary generation, and may be used in combination as follows.

It may be defined whether the terminal feeds back the UCI on the xPUCCH or the xPUSCH according to the instruction (or indication) of the base station. Hereinafter, a method for indicating whether a terminal feeds back UCI to an xPUCCH or an xPUSCH will be described.

For example, the base station may explicitly indicate based on the DCI whether the terminal transmits the UCI on the xPUCCH or the xPUSCH. For example, it may be indicated to transmit the UCI on the xPUCCH if 1-bit is '0', and transmit the UCI on xPUSCH if the 1-bit is '1'.

As another example, the base station may implicitly indicate based on the DCI whether the terminal transmits the UCI on the xPUCCH or the xPUSCH. That is, if the terminal receives an uplink grant (UL grant) for the xPUSCH through the UL DCI in an 'n-k'-th downlink subframe (DL subframe) based on a time (for example, 'n'-th subframe) to report the UCI (k>0), the terminal transmits the UCI on the xPUSCH. Otherwise, (for example, if the grant for the xPUCCH is received via the DL DCI in the 'n-k'-th DL subframe based on the 'n'-th subframe), the terminal transmits the UCI on the xPUCCH.

Describing specifically, when the base station desires to set the terminal to report the UCI through the xPUCCH in the n subframe which is the reporting time, the base station can transmit the DL DCI to the terminal in the n-k-th downlink subframe. In this case, the DL DCI may include a field for triggering the UCI reporting, and the field may consist of 3 bits, for example.

Therefore, the terminal receiving the DL DCI in the n-k-th downlink subframe may identify that the n-th subframe is the subframe allocated with the xPUCCH, and may report the UCI through the xPUCCH in the subframe. At this time, the terminal can identify the k value based on the information included in the received DL DCI.

When the base station intends to set to report the UCI through the xPUCCH in the n subframe which is the reporting time of the terminal, the base station can transmit the UL DCI to the terminal in the n-k-th downlink subframe. In this case, the UL DCI may include a field for triggering the UCI reporting, and the field may consist of 3 bits, for example. Therefore, the terminal may report the UCI through the xPUSCH using the resource allocation information included in the UL DCI.

On the other hand, the information for triggering the UCI report may be included in the DCI received in the (n-k)-th downlink subframe or may be included in a separate DCI. The detailed content thereof will be described below.

In this manner, when the terminal receives the DCI, the terminal may decode the DCI and then determine whether the corresponding DCI is the DL DCI or the UL DCI, and transmit the uplink control information through the xPUSCH or the xPUCCH at the reporting time according to the determination result.

At this time, the terminal may identify the DL DCI or the UL DCI based on a DCI format promised between the base station and the terminal or a specific field within the DCI.

For example, if the DCI is identified in the DCI format, the base station and the terminal need to be promised in advance that A bits are the DC DCI (DCI Format A) and B bits are the UL DCI (DCI Format B).

Otherwise, if the DCI is identified based on a specific field in the DCI, y bits constituting a most significant bit (MSB) of a DCI Field consisting of x bits and y bits constituting a least significant bit (LSB) of the DCI Field may indicate the DL DCI or the UL DCI. The size of y in the y bits described above may be different depending on the type of DCI supported by the system. For example, if a particular system supports four types of DCIs, then y=2, if it is '00', then it may mean UL DCI for single layer transmission of the xPUSCH, and if it is '01', it may mean UL DCI for multi-layer transmission of the xPUSCH. In addition, if it is '10', it may also mean DL DCI for single layer transmission of the xPDSCH and if it is '10', it may mean DL DCI for multi-layer transmission of the xPDSCH.

In the above example, the MSB or the LSB of a specific Field in the DCI received by the terminal consists of '00' or '01' (UL DCI), and if the terminal has UCI information to be transmitted to the base station, the terminal transmits the UCI through the xPUSCH. In addition, the MSB or the LSB in the DCI Field received by the terminal consists of '00' or '01' (DL DCI), and if the terminal has UCI information to be transmitted to the base station, the terminal transmits the UCI through the xPUCCH.

Meanwhile, when the base station indicates the terminal to transmit the UCI through the xPUSCH of the n-th subframe, the base station may additionally indicate whether the UCI should be multiplexed with data to be transmitted on the xPUSCH or only the UCI should be transmitted on the xPUSCH without data. At this time, the base station can determine whether to multiplex data with the UCI based on the 1-bit indication of the DCI. The 1-bit indication may be referred to as a multiplexing or non-multiplexing indication.

For example, the terminal receives the DCI from the base station. The terminal receiving the DCI demodulates and decodes the DCI, and determines whether it is the UL DCI or the DL DCI based on the DCI format or a specific Field in the DCI. The terminal determining that it is the UL DCI determines whether or not information related to the UCI transmission (hereinafter, referred to as UCI transmission information) is included in the corresponding DCI.

In this case, the UCI transmission information may include a time/frequency resource of an uplink data channel (xPUSCH) for transmitting the UCI. At this time, the time resource information of the xPUSCH may be a symbol index (Index) (or the number of symbols), a slot index, or a subframe index of the xPUSCH on which the UCI is to be transmitted. On the other hand, the frequency resource information of the xPUSCH may include a location of a resource block (RB) and the number of RBs of the xPUSCH on which the UCI is to be transmitted.

If the DCI field includes the UCI transmission information, the terminal determines whether there is a 1-bit indication field indicating whether to transmit only UCI information without transmitting data or to multiplex the UCI with the data information. If the terminal is indicated to transmit only the UCI information without transmitting data to the DCI Field, the terminal transmits only the UCI information on the xPUSCH.

For example, when the 1-bit information is 1, it is indicated to transmit only the UCI information without transmitting data, and when it is 0, if it is assumed that it is indicated that data and the UCI information are multiplexed and transmitted, in the case in which the 1-bit indication is set to be 1, the terminal can transmit only the UCI information.

On the other hand, when the 1-bit information of the DCI field is set to be 0, the terminal multiplexes the UCI with data and transmits the multiplexed UCI and data on the xPUSCH. When the UCI is transmitted by being multiplexed with data, frequency resource information for transmitting the UCI in the UCI transmission information may be omitted. This is because the frequency resource information for the data transmission is the same as the frequency resource information for the UCI transmission.

The base station may determine whether the base station indicates the terminal to transmit the UCI on the xPUCCH or the xPUSCH by using various methods.

For example, when the base station determines that the uplink channel state of the terminal is bad and thus the coverage for the uplink control information transmission is insufficient, the base station transmits the indication, which allows the terminal to transmit the UCI on the xPUSCH, through the DCI.

As another example, when the amount of UCI to be fed back by the terminal is equal to or greater than the specific number of bits (for example, [x] bits) (for example, when a size of bits of the UCI is defined as A, in the case of A>[x] bits), the base station may issue an indication to transmit the UCI on the xPUSCH. At this time, the specific number of bits can be referred to as a threshold bit value.

As another example, when the amount of UCI to be fed back by the terminal is equal to or greater than a first specific bit (for example, [X] bits) (A [x] bits), the base station may increase the number of symbols of the xPUCCH for transmitting the UCI.

In this case, the base station can use the feedback count information set in the terminal in order to identify the amount of UCI to be fed back by the terminal.

For example, if the amount of UCI is smaller than or equal to [x] bits (A [x] bits), as the number of symbols of the xPUCCH for transmitting the UCI, one symbol may be used. In the assumption, if the amount of UCI is greater than [x] bits (A>[x] bits), the base station increases the number of symbols of the xPUCCH for transmitting UCI to two. The base station may notify, through the DCI, whether the number of symbols of the xPUCCH is one or two.

Meanwhile, if the amount of UCI is greater than a second specific bit (for example, [y] bits) (A>[y] bits, in this case, y>x), the base station may indicate the terminal to transmit the UCI on the xPUSCH. In this case, the first specific bit may be referred to as a first threshold bit value, and the second specific bit may be referred to as a second threshold bit value. The present example describes that the number of symbols of the xPUCCH is one or two, but the number of symbols is not limited thereto.

Thus, the threshold value can be additionally set, and the base station can increase the number of symbols of the xPUCCH each time exceeding each threshold value.

In addition, the base station can transmit information on the above-described threshold value to the terminal. At this time, the base station may include the information on the threshold value in the DCI transmitted to the terminal, and may transmit the information on the threshold value through the system information or the RRC signaling. In addition, if the number of UCI bits exceeds the threshold value, the base station may transmit information for configuring the UCI to be transmitted on the xPUSCH or information for configuring the UCI to increase the number of symbols to the terminal through DCI, system information or RRC signaling.

Meanwhile, based on the information that the base station has indicated by the DCI, the terminal may determine whether to transmit the information to be fed back by the terminal on the xPUCCH or the xPUSCH.

As described above, the base station can explicitly indicate whether to transmit the UCI on the xPUCCH or the xPUSCH using the 1-bit information, and the terminal can determine whether to transmit the UCI information on the xPUCCH or the xPUSCH.

In another example, the base station may implicitly indicate whether to transmit the UCI on the xPUCCH or the xPUSCH.

Accordingly, after receiving and decoding the DCI, the terminal can determine whether the corresponding DCI is the DL DCI or the UL DCI. As described above, the terminal can identify whether it is the DL DCI or the UL DCI through the DCI format promised to the base station and the terminal or the specific field in the DCI. The details are the same as those described above.

If the DCI is the DL DCI is used, the terminal can transmit the UCI through the xPUCCH at the reporting time. If the DCI is the UL DCI, the terminal can transmit the UCI through the xPUSCH at the reporting time.

In addition, the terminal can determine whether to transmit the UCI on the xPUCCH or the xPUSCH based on the amount of UCI information to be fed back by the terminal.

For example, the terminal recognizes that the UCI should be transmitted on the xPUSCH when the amount of UCI information is greater than [x] bits ([x] bits) (A>[x] bits) If the information on the specific number of bits and the amount of UCI are greater than the specific number of bits, the terminal can receive through the DCI the information indicating that the UCI is transmitted on the xPUSCH.

When the reporting time is the n-th subframe, if the DCI received in the n-k-th subframe fails to detect the resource allocation information for the xPUSCH (i.e., the base station transmits an UL grant for the xPUSCH, but the terminal does not receive the UL grant), the terminal requests the resource allocation for the xPUSCH to the base station.

As another example, when the amount of UCI information to be fed back by the terminal is greater than the specific number of bits ([x] bits) but the UCI is not fed back on the xPUSCH because the grant for the xPUSCH is not received, only the terminal securing the grant for the xPUCCH makes the UCI information into the specific number of bits depending on the defined rule and transmits the UCI information on the xPUCCH.

In this case, the rule on which information is not transmitted needs to be defined in advance based on the appointment between the base station and the terminal and the [x] bits may be made in order of the HARQ-ACK/NACK, the Beam related information (BI, BQI), and the CQI/PMI, and the RI to be transmitted on the xPUCCH.

Alternatively, the base station may notify the terminal of the rule through the system information or the RRC signaling. Therefore, the terminal can generate the UCI in the defined order, and if the generated UCI exceeds the specific number of bits, the terminal may not include the posterior rank information.

Hereinafter, the operation of the terminal for the UCI transmission will be described when a specific terminal is allocated with the xPUCCH and the xPUSCH in the same subframe.

Option 1) The terminal transmits the UCI through one of the xPUCCH and the xPUSCH in the same subframe.

Option 1-1) When only the xPUSCH is transmitted: At this time, the number of symbols used for the xPUSCH transmission is larger than the number of symbols used for the xPUCCH, and therefore the operation of the terminal may be defined to transmit the UCI on the xPUSCH (that is, multiplexing of data and the UCI) to secure the coverage and not to use the xPUCCH.

Option 1-2) When the UCI is transmitted only on the xPUCCH: Priority is allocated to the specific UCI (for example, HARQ-ACK/NACK) transmission, thus the corresponding UCI is transmitted on xPUCCH and the remaining UCI is not transmitted in the same subframe. For this reason, when the HARQ-ACK/NACK is transmitted on the xPUSCH, the number of HARQ process IDs to be stored by the base station may increase and the HARQ round trip time may increase, due to the decoding latency. Therefore, the HARQ ACK/NACK information may be transmitted through the xPUCCH to solve the above problem. In this case, the UCI or data are not transmitted through the xPUSCH.

Option 2) The terminal transmits the UCI through both of the xPUCCH and the xPUSCH in the same subframe.

Option 2-1) When the UCI is transmitted only on the xPUCCH: The combinations of all the UCIs are transmitted only on the xPUCCH and data are transmitted on the xPUSCH.

Option 2-2) Like the Option 1-2, the specific UCI is transmitted only on the xPUCCH (for example, HARQ-ACK/NACK) and the xPUSCH may be used only for the data transmission or multiplex data with the specific UCI and transmit the multiplexed data and specific UCI.

Meanwhile, the terminal may perform a transmission power control when transmitting the xPUCCH or the xPUSCH. When the xPUCCH and the xPUSCH can be transmitted in the same subframe (Option 2-1, Option 2-2), since the frequency resource sizes of the xPUCCH and the xPUSCH transmitted by the terminal may be different from each other or QoSs (e.g., block error rate (BLER), spectral efficiency, etc.) of the xPUCCH and the xPUSCH may be different, the xPUCCH and the xPUSCH may use different transmission power. If the transmission power difference between the xPUSCH and the xPUCCH is large, a problem may arise in the setting of the transmission power of the xPUCCH immediately following the transmission power setting for the xPUSCH transmission. Therefore, when the terminal uses the xPUCCH and the xPUSCH in the same subframe, the terminal operation for the next transmission power control may be considered.

Option 1) xPUSCH and xPUCCH use the same transmission power: The xPUSCH and the xPUCCH use the same transmission power. In this case, the transmission power may be set to be the minimum value of the xPUSCH and the xPUCCH or the maximum value of the xPUSCH and the xPUCCH. When the transmission power is set to be the minimum value, there is an advantage that interference caused by adjacent cells may be reduced and the power consumption of the terminal may be reduced. Alternatively, when the transmission power is set to be the maximum value, the coverage of the uplink channels (xPUSCH and xPUCCH) may be increased. The setting values are appointed values between the base station and the terminal. The base station broadcasts, as the system information, the setting values to all the terminals present in the cell of the base station through a system information block (SIB) or may be semi-statically changed in an RRC connection setup or and RRC Connection reconfiguration. Further, the base station may perform a closed-loop transmission power control through the DCI, and therefore may dynamically notify the terminal of the information through the DCI.

Option 2) The xPUSCH and the xPUCCH use different transmission power: If the xPUSCH and the xPUCCH are transmitted in the same subframe and the xPUSCH and the xPUCCH are to be transmitted using different transmission power, after a gain value of an analog device for controlling the transmission power of the xPUCCH is adjusted, a gain value of an analog device for the transmission power control of the xPUCCH should be controlled. To this end, since it takes sufficient time to adjust the gain value of the analog device for the transmission power control of the xPUCCH after adjusting the gain value of the analog device for controlling the xPUSCH transmission power, when the xPUSCH and the xPUCCH should be simultaneously transmitted, the corresponding symbol may be used as a guard time without transmitting data to the last symbol of the xPUSCH. At this time, the base station may notify the guard time through the DCI.

For example, the base station may specify, in the DCI, the start and end points of symbols used by the xPUSCH and the number of symbols used by the xPUSCH. Under the assumption, if it is necessary to use the guard time for the xPUCCH transmission, the base station may reduce the number of symbols used for the xPUSCH transmission through the DCI and explicitly notify it. (For example, when the number of symbols used for the xPUSCH transmission in one subframe is 11, the number of symbols used for the xPUSCH transmission is set to be 10 for the purpose of the guard Time for the xPUCCH transmission, which may be notified to the terminal through the DCI).

In another example of the setting of the guard time, when the xPUSCH and the xPUCCH are to be transmitted in the same subframe, the terminal punctures the last xPUSCH symbol, uses it as the guard time, and transmits the xPUCCH.

Meanwhile, when the terminal transmits the UCI on the xPUCCH in a specific subframe, the terminal may configure the xPUCCH according to the type of UCIs as follows:

xPUCCH format 1: Used for scheduling request (SR) transmission;

xPUCCH format 1 a: Used for 1-bit HARQ ACK/NACK transmission;

xPUCCH format 1b: Used for 2-bit HARQ ACK/NACK transmission;

xPUCCH format 2: Used for transmission of SR, HARQ ACK/NACK, CQI/PMI, RI, and beam related information (BI, BQI) and there may be various combinations. In addition, when the terminal transmits a plurality of uplink control information through xPUCCH 2, it may combine the HARQ ACK/NACK, SR, CQI/PMI, RI, beam related information (BI, BQI), and BRRS information in order to transmit the UCI. For example, the HARQ ACK/NACK, the CQI/PMI, and the RI may be multiplexed and transmitted. As another example, the HARQ ACK/NACK and the CQI/PMI may be multiplexed and transmitted, or the HARQ ACK/NACK and the RI may be multiplexed and transmitted. As another example, the HARQ ACK/NACK, the BI, and the BQI may be multiplexed and transmitted. As another example, the 1-bit explicit SR information may be transmitted by being multiplexed with the previous information (i.e., HARQ ACK/NACK+CQI/PMI+RI+SR or HARQ ACK/NACK+BI+BQI+SR). As another example, the HARQ ACK/NACK and the 1-bit explicit SR information may be multiplexed and transmitted. In this manner, when the terminal simultaneously transmits a plurality of control information through the xPUCCH, it may transmit various combinations of control information as described above.

The HARQ ACK/NACK information may be transmitted in the xPUCCH format 1a/1b and the xPUCCH format 2. Through which xPUCCH format the HARQ ACK/

NACK feedback information transmitted by the terminal is to be transmitted may be determined by the following.

Assuming that the HARQ ACK/NACK bits=N to be fed back by the terminal, it is obvious that if N=1, the xPUCCH format 1a is used and if N=2, the xPUCCH format 1b is used. However, there may be various methods for allowing the terminal to determine to what value N is set in the xPUCCH format 2. For example, when the HARQ ACK/NACK is transmitted like the LTE system, the N may be determined according to whether to perform bundling or how many the DL subframe is multiplexed. As another example, the base station may notify the UE of an N value through RRC signaling as long as it does not exceed the maximum HARQ process number.

At this time, the base station may notify the terminal about what combination the terminal uses to perform the transmission in the xPUCCH format 2 by using the following method.

Option 1) It can be explicitly notified through the DCI. For example, when the possible combinations are configured as ① HARQ ACK/NACK only (2-bit or more), ② CQI/PMI+RI only, ③ CQI/PMI+RI+HARQ ACK/NACK, ④ Beam information only, and ⑤ Beam information+HARQ ACK/NACK, it is possible to notify whether to transmit the UCI in the xPUCCH format 2 using any combination of the above five combinations using 3 bits in the DCI.

Option 2) As another method for notifying which UCI information will be transmitted in the xPUCCH format 2, the xPUCCH resource index may be used. For example, the base station may notify the terminal of the fact that ① HARQ ACK/NACK only (in the case of 2-bit or more) uses xPUCCH frequency resource-1, ② CQI/PMI+RI only uses xPUCCH frequency resource-2, ③ CQI/PMI+RI+HARQ ACK/NACK uses xPUCCH frequency resource-3, ④ Beam information only uses xPUCCH frequency resource-4, ⑤ Beam information+HARQ ACK/NACK uses xPUCCH frequency resource-5 through the UE-specific RRC signaling. The terminal performs the transmission in the xPUCCH format 2 transmitted in the n-th subframe using one of the above combinations. Since the base station does not know which combination the terminal uses to perform the transmission (for example, when the terminal does not receive a part of the DCI), it should perform blind searching in each of the resources.

Option 3) Since the base station identically allocates the xPUCCH frequency resource for the CQI/PMI and HARQ ACK/NACK feedback in consideration of the previous error case, i.e., the multiplexing of the UCI but does not know the fact when not receiving one of the grants, it may not perform the decoding. Therefore, it is possible to explicitly include which information is transmitted by being multiplexed with the UCI. In the above example, if the terminal transmits '011', the combination corresponding to ③ is transmitted. For the above operation, the MSB or the LSB should be emptied as many as the number (in the above example, 3 bits) of possible combinations to transmit the multiplexed information to the UCI that the terminal transmits.

Option 4) In order to reduce the signaling overhead and the number of blind searching in the base station, a combination of the Option 2 and the Option 3 is possible. That is, the MSB or LSB x bits of the UCI transmitted by the terminal in the xPUCCH format 2 represents information on which information is transmitted (in the above example, CQI/PMI+RI=② or ③ or Beam information=④ or ⑤), and the base station may blindly search whether ② or ③ is transmitted or whether ④ or ⑤ is transmitted.

The above contents are examples for convenience of explanation, and various modifications may be possible based on the above description.

The combinations of UCIs transmitted in the xPUCCH format 2 may be adjusted not to exceed [x] bits to the maximum by the base station scheduler. If the combinations exceed the [x] bits, the terminal may request the xPUSCH transmission to the base station (if xPUSCH allocation is not received) or may discard some bits or generate [x] bits according to the defined rule. That is, the terminal may drop certain bits having low priority according to the defined rule. At this time, the maximum [x] bits may be referred to as a threshold bit value, and the information on a threshold bit value may be transmitted to the terminal through the DCI, the system information, or the RRC signaling.

For example, the defined rule may be set in order of HARQ-ACK/NACK, SR information, Beam related information (BI, BQI), CQI/PMI, and RI. At this time, it is assumed that the threshold bit value is determined to be 22 bits. If the HARQ ACK/NACK generated by the terminal is 4 bits, when the SR is 1 bit, the beam related information is 16 bits, the RI is 1 bit, and the CQI/PMI is 6 bits, the terminal may drop RI and CQI/PMI and generate the UCI using the remaining information.

As another example, if the size of the combinations of the UCIs transmitted in the xPUCCH format 2 is greater than the [x] bits, the terminal may request the base station to increase the number of symbols of the xPUCCH.

As another example, if the size of the combinations of the UCIs transmitted in the xPUCCH format 2 is greater than the [x] bits and smaller than [y] bits, the terminal may request the base station to increase the number of symbols of the xPUCCH.

The above contents are examples for convenience of explanation, and various modifications may be possible based on the above description.

The resource allocation method for xPUCCH format 1/1a/1b and xPUCCH format 2 transmitted by the terminal may be considered as follows:

Option 1) All time/frequency resources may be allocated to DCI. For example, the base station may indicate an 'n+K'-th subframe in which the xPUCCH is transmitted through the DL DCI in the 'n'-th subframe. At the same time, the base station may indicate the frequency resource on which the xPUCCH is transmitted through the DL DCI.

Option 2) The time/frequency resources may be allocated through a combination of the DCI and the RRC signaling. For example, the base station may previously set the period of the UCI information (e.g., SR and beam related information) to be periodically transmitted through the RRC signaling and notify the offset information of the subframe through the DCI. For example, if it is assumed that the base station sets the xPUCCH allocation period of the specific terminal is 10 ms through RRC signaling, the terminal may expect to allocate the xPUCCH every 10 ms.

However, for various reasons (when the issue of the base station scheduling or the beam of the terminal is changed), the base station may offset the xPUCCH time to be periodically allocated to change the xPUCCH time. The time offset information is transmitted through the DCI. At this time, the offset information transmitted through the DCI should be transmitted to the terminal before the time when the xPUCCH is actually allocated periodically.

Option 3) As another example of allocating time/frequency resources through the combination of the DCI and the RRC signaling, the base station may set a set of frequency resources through the RRC signaling and notify, through the DCI, the offset information of the frequency resource and a subframe index where the xPUCCH is transmitted.

This will be described below in more detail.

FIG. 1 is a diagram illustrating a frame structure for transmitting downlink data according to the present disclosure.

In FIG. 1, one subframe may consist of N OFDM symbols and M OFDM subcarriers.

FIGS. 1(a) and 1(b) illustrate an example where one subframe includes a downlink control channel (xPhysical downlink control channel (xPDCCH)) for downlink control information transmission and a data channel (xPhysical downlink shared channel (xPDSCH)) for downlink data information transmission.

K symbols before the subframe may be used for the xPDCCH transmission, and the remaining N-K OFDM symbols and M OFDM subcarriers may be used for the xPDSCH transmission. FIG. 1(a) illustrates an example for K=1, and FIG. 1(b) illustrates an example for K=2.

In the present disclosure, the operation of transmitting the control information through the xPDCCH may be expressed as transmitting the xPDCCH, and the operation of transmitting data through the xPDSCH may be expressed as transmitting the xPDSCH.

Meanwhile, FIGS. 1(c) and 1(d) are examples where one subframe consists of the xPDCCH, the xPDSCH, and the uplink control channel (xPhysical control channel (xPUCCH)) for transmitting the uplink control information. In this case, a guard period is required for the purpose of a transmission/reception transition time for receiving the uplink control information from the terminal after the base station performs the downlink data transmission between the xPDSCH and the xPUCCH.

FIGS. 1(c) and 1(d) show an example where one symbol is used as the guard period. FIGS. 1(c) and 1(d) illustrate an example where K symbols before the subframe are used for the xPDCCH transmission, one symbol is used as the guard period, and one symbol is used as the xPUCCH. The remaining N-K-2 OFDM symbols and the M OFDM subcarriers are used for the xPDSCH transmission.

FIG. 1(c) illustrates an example for K=1, and FIG. 1(d) illustrates an example for K=2. Although not illustrated in the above drawings, in FIGS. 1(c) and 1(d), the base station may transmit a sounding reference signal (SRS) for measuring the uplink channel state of the terminal to the symbol position of the xPUCCH.

In FIGS. 1(a), 1(b), 1(c), and 1(d), the base station may broadcast, as the system information, whether the number K of symbols used for the xPDCCH transmission is 1 or 2 to all terminals within a cell. That is, the base station can inform the terminal of the master information block (MIB) or the system information block (SIB) which include the number of symbols of the xPDCCH.

As another example, the base station may notify the terminal of the number of xPDCCH symbols through UE specific RRC signaling. In this case, when the base station drops the grant to the xPDCCH before establishing the RRC connection, there is a problem in that the terminal may not know the number of symbols of the xPDCCH. In order to prevent this, the default number of symbols is always used until RRC connection setup, or the number of xPDCCH symbols is specified in a message of random access response RAR, and the number of xPDCCH symbol for RAR grant transmission can be fixed to 1 at all times. As another example, the base station does not transmit any information about the number of symbols of the xPDCCH to the terminal, and the terminal may blindly search for the number of xPDCCH symbols.

As another example, the base station may include bit information indicating the number of symbols of the xPDSCH in the DCI, and the number of bits of the bit information may be changed. For example, it may be indicated that if the bit information is '00', N-1 symbols are used as the xPDSCH, if the bit information is '01', 'N-2' symbols are used as the xPDSCH, and if the bit information is '10', N-3' symbols are used as the xPDSCH. The bit information may indicate the number of symbols of the xPDSCH of the subframe after the k-th subframe. In this case, the N may mean the number of symbols of the subframe after the k-th subframe.

On the other hand, when the xPUCCH exists in the corresponding subframe as illustrated in FIGS. 1(c) and 1(d), if the base station does not notify this fact, the terminal performing only the downlink data reception does not know the number of symbols of the xPDSCH to be used for the downlink data reception and therefore may not perform the decoding. In order to solve this problem, the base station can indicate the number of symbols of the xPDSCH of the corresponding subframe through the control information (for example, DCI) transmitted through the xPDCCH.

At this time, the base station may notify the number of xPUCCHs through the system information, the RRC signaling, or the DCI.

In addition, as shown in FIGS. 1(c) and 1(d), the xPUCCH exists in the corresponding subframe, but the number of symbols of the xPUCCH may be changed, but the base station may indicate the number of symbols of the xPUCCH and the symbol position of the xPUCCH through the DCI. For example, if there are three symbols used in the xPUCCH in a specific subframe, the terminal A can use all three symbols for the UCI transmission to transmit the xPUCCH, and the terminal B can use only two symbols for the UCI transmission to transmit the xPUCCH.

Therefore, the base station may indicate the terminal A that the number of symbols used for the xPUCCH is three in the specific subframe through the DCI, and indicate the terminal B that the number of symbols of the xPUCCH is two. At this time, the base station can notify the terminal of the number of symbols of the xPUCCH using the predetermined number of bit information.

Also, when the terminal C and the terminal D respectively use, as the xPUCCH, only one symbol for the UCI transmission by the terminals C and D, the symbol index of the xPUCCH used by the terminal C and the symbol index of the xPUCCH used by the terminal D may be the same as or different from each other.

Therefore, the base station can indicate the symbol index of the xPUCCH used by the terminal C and the symbol index of the xPUCCH used by the terminal D through the DCI. At this time, the base station can notify the terminal of the number of symbols of the xPUCCH using the predetermined number of bit information. However, the embodiment of the present disclosure is not limited thereto, and the symbol index of the xPUCCH to be used by the terminal may be set differently even if the number of symbols of the xPUCCH is not one, and the base station may notify the symbol index and the number of symbols of the xPUCCH to be used by the terminal.

Also, when the number of symbols of the xPUCCH is notified through the DCI, the number of symbols of the xPDSCH may be omitted. For example, when the number of symbols of the guard period is set to be 1, the terminal may identify the number of symbols of the xPDSCH based on the number of symbols of the subframe, the K value obtained by the above method, and the number of symbols of the xPUCCH.

However, if the number of symbols of the guard period is changed, the base station may additionally include the information on the number of symbols of the guard period in the DCI, and the terminal may identify the number of symbols of the xPDSCH using the information. Alternatively, as described above, the base station may also notify the number of symbols of the xPDSCH considering the number of symbols of the guard period.

However, the present disclosure is not limited thereto, and the base station may inform the number of symbols and the symbol index of the xPUCCH, and the number of symbols of the xPDSCH through the DCI.

Also, in the case where the base station transmits the xPUCCH in a specific subframe and the terminal-B receives the xPDSCH, the base station may separately notify the respective terminals of the number of symbols. That is, the number of xPUCCH symbols may be informed to the terminal-A and the number of xPDSCH symbols may be notified to the terminal-B. FIG. 2 is a diagram illustrating a frame structure for transmitting uplink data according to the present disclosure.

In FIG. 2, one subframe may consist of N OFDM symbols and M OFDM subcarriers.

FIGS. 2(a) and 2(b) illustrate an example where one subframe includes a downlink control channel (xPhysical downlink control channel (xPDCCH)) for uplink control information transmission and a data channel (xPhysical uplink shared channel (xPUSCH)) for uplink data information transmission.

K symbols before the subframe are used for the xPDCCH transmission, and the remaining N-K OFDM symbols and the M OFDM subcarriers are used for the xPUSCH transmission. FIG. 2(a) illustrates an example for K=1, and FIG. 2(b) illustrates an example for K=2.

In this case, a guard period is required for the purpose of a transmission/reception transition time for receiving the uplink control information from the terminal after the base station performs the downlink data transmission between the xPDSCH and the xPUCCH. FIG. 2 illustrates an example where one symbol is used as the guard period. However, the number of symbols in the guard period may be changed.

Meanwhile, FIGS. 2(c) and 2(d) are examples in which one subframe consists of xPDCCH, xPUSCH, and xPUCCH.

In FIGS. 2(c) and 2(d), K symbols before the subframe are used for the xPDCCH transmission, one symbol is used as the guard period, and one symbol is used as the xPUCCH. The remaining N-K-2 OFDM symbols and the M OFDM subcarriers are used for the xPDSCH transmission.

FIG. 2(c) illustrates an example for K=1, and FIG. 2(d) illustrates an example for K=2. Although not illustrated in the above drawings, in FIGS. 2(c) and 2(d), the base station may transmit the sounding reference signal (SRS) for measuring the uplink channel state of the terminal to the symbol position of the xPUCCH.

Similar to FIG. 1, in FIGS. 2(a), 2(b), 2(c), and 2(d), the base station may broadcast, as the system information, whether the number K of symbols used for the xPDCCH transmission is 1 or 2 to all terminals within a cell. That is, the base station may notify the terminal of the number of symbols of the xPDCCH by including the number of symbols of the xPDCCH in the MIB or the SIB.

As another example, the number of xPDCCH symbols may be notified through UE specific RRC signaling. In this case, when the base station drops the grant to the xPDCCH before establishing the RRC connection, there is a problem in that the terminal may not know the number of symbols of the xPDCCH. To prevent this, the default number of symbols is always used until the RRC connection is established, or the number of xPDCCH symbols is specified in the RAR message, and the number of xPDCCH symbols for the RAR grant transmission may be always fixed to 1.

As another example, there may be a method for blindly searching for, by the terminal, the number of xPDCCH symbols without the base station transmitting any information on the number of symbols of the xPDCCH to the terminal.

On the other hand, when the xPUCCH exists in the corresponding subframe as illustrated in FIG. 2 (c) and FIG. 2 (d), if the base station does not notify this fact, the terminal transmitting only the xPUSCH in the corresponding subframe may not perform resource mapping since the terminal does not know the number of symbols of the xPUSCH to be used of the uplink data transmission. To solve this problem, the base station may indicate the number of symbols of the corresponding subframe through the DCI of the xPDCCH.

As another example, the base station may include bit information indicating the number of symbols of the xPDSCH in the DCI, and the number of bits of the bit information may be changed. For example, it may be indicated that if the bit information is '00', N-1 symbols are used as the xPDSCH, if the bit information is '01', 'N-2' symbols are used as the xPUSCH, and if the bit information is '10', N-3' symbols are used as the xPUSCH.

Meanwhile, as shown in FIGS. 2(c) and 2(d), the xPUCCH exists in the corresponding subframe, but the number of symbols of the xPUCCH may be changed, but the base station may indicate the number of symbols and the symbol position of the xPUCCH through the DCI. For example, if there are three symbols used in the xPUCCH in a specific subframe, the terminal A can use all three symbols for the UCI transmission to transmit the xPUCCH, and the terminal B can use only two symbols for the UCI transmission to transmit the xPUCCH.

Therefore, the base station may indicate the terminal A that the number of symbols used for the xPUCCH is three in the specific subframe through the DCI, and indicate the terminal B that the number of symbols of the xPUCCH is two. At this time, the base station can notify the terminal of the number of symbols of the xPUCCH using the predetermined number of bit information.

Also, when the terminal C and the terminal D respectively use, as the xPUCCH, only one symbol for the UCI transmission by the terminals C and D, the symbol index of the xPUCCH used by the terminal C and the symbol index of the xPUCCH used by the terminal D may be the same as or different from each other.

Therefore, the base station can indicate the symbol index of the xPUCCH used by the terminal C and the symbol index of the xPUCCH used by the terminal D through the DCI. At this time, the base station can notify the terminal of the number of symbols of the xPUCCH using the predetermined number of bit information. However, the embodiment of the present disclosure is not limited thereto, and the symbol index of the xPUCCH to be used by the terminal may be set differently even if the number of symbols of the xPUCCH is not one, and the base station may notify the symbol index and the number of symbols of the xPUCCH to be used by the terminal.

Also, when the number of symbols of the xPUCCH is notified through the DCI, the number of symbols of the xPUSCH may be omitted. For example, when the number of symbols of the guard period is set to be 1, the terminal may identify the number of symbols of the xPDSCH based on the number of symbols of the subframe, the K value obtained by the above method, and the number of symbols of the xPUSCH.

However, if the number of symbols of the guard period is changed, the base station may additionally include the information on the number of symbols of the guard period in the DCI, and the terminal may identify the number of symbols of the xPUSCH using the information. Alternatively, as described above, the base station may also notify the number of symbols of the xPDSCH considering the number of symbols of the guard period.

However, the present disclosure is not limited thereto, and the base station may inform the number of symbols and the symbol index of the xPUCCH, and the number of symbols of the xPUSCH through the DCI.

FIG. 3 is a diagram illustrating an uplink control channel for transmitting uplink control information according to an embodiment of the present disclosure.

The uplink control channel, the xPUCCH may be transmitted in the last K symbol of the subframe, as illustrated in FIGS. 1(c) and 1(d) and FIGS. 2(c) and 2(d).

A plurality of users may transmit the xPUCCH in one cell. At this time, frequency division multiplexing (FDM), time division multiplexing (TDM), or code division multiplexing (CDM) in the same time-frequency resources may be performed between the xPUCCHs used by users.

For example, there may be N resource block groups (RBGs) in the system bandwidth. At this time, one RBG may consist of M resource blocks (RB), and one RBG may be the resource of the xPUCCH transmitted by one user. One RB consists of 12 OFDM subcarriers (tones). Of the 12 subcarriers, L subcarriers may be used as a DeModulation reference signal (DMRS) used for xPUCCH channel estimation of the base station. Thus, 12-L OFDM subcarriers may be used for the UCI transmission.

More specifically, referring to the drawings of the present disclosure, a subcarrier on which the DMRS is transmitted may be located symmetrically with respect to the center of the RB, and may be set to be spaced up and down from the center of the RB by two subcarriers. When the xPUCCH is set as described above, frequency selectivity may be increased.

Figure 4:
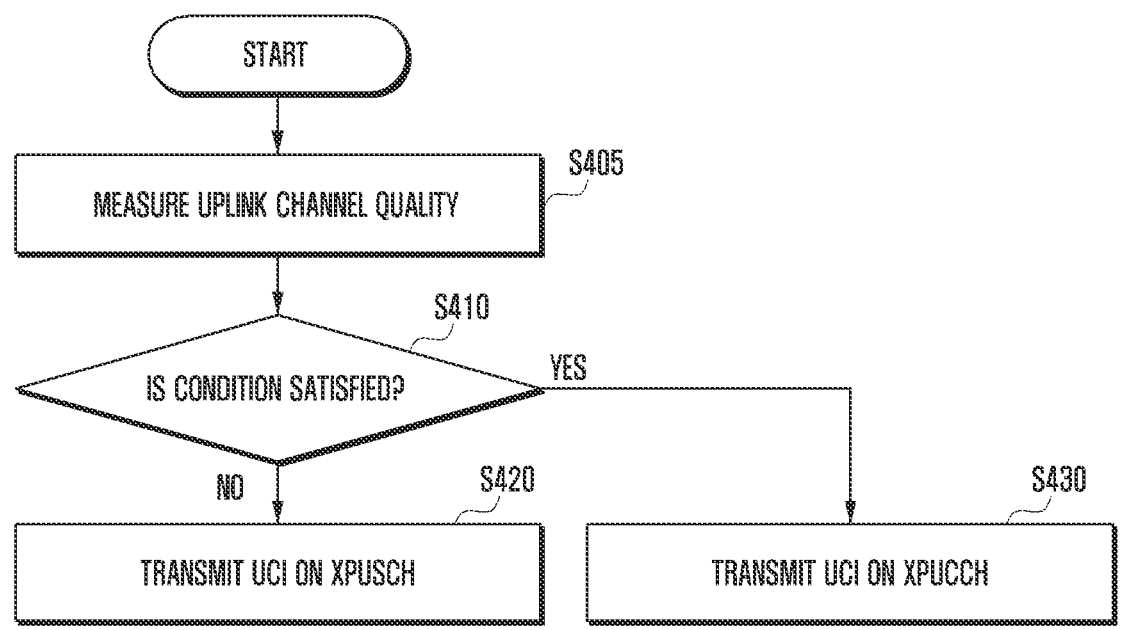
FIG. 4 is a diagram illustrating an operation of a base station for transmitting uplink control information according to an embodiment of the present disclosure.

FIG. 4 is a diagram illustrating an operation of a base station for transmitting uplink control information according to an embodiment of the present disclosure.

The base station may measure the uplink channel quality in step S405. The base station may measure the uplink channel quality of the terminal by measuring the sounding reference signal (SRS) or the DMRS of the uplink xPUCCH or xPUSCH that the terminal transmits on the uplink. Based on this, the base station may adjust the number of symbols of the xPUCCH to be transmitted subsequently, and determine whether to transmit the UCI on the xPUCCH or the xPUSCH.

The base station may determine based on various methods or conditions whether the base station instructs the terminal to transmit the UCI on the xPUCCH or the terminal to transmit the UCI on the xPUSCH. The details will be described below.

Therefore, the base station may identify whether or not a specific condition is satisfied in step S410. In this case, the details will be described below.

If the specific conditions are not satisfied, the base station may indicate the transmission of the UCI on the xPUSCH in step S420.

On the other hand, if the specific conditions are not satisfied, the base station may indicate the transmission of the UCI on the xPUSCH in step S430.

For example, the base station may determine whether the coverage for the uplink control information transmission is sufficient (condition 1). The base station may indicate the terminal to transmit the UCI on the xPUSCH if it is determined that the coverage of the uplink control information transmission is insufficient because the uplink channel quality of the terminal is poor as a result of the uplink channel quality measurement.

As another example, the base station may determine whether the amount of UCI to be fed back by the terminal is smaller than a certain number of bits (condition 2). When the amount of UCI to be fed back by the terminal is equal to or greater than a specific number of bits (for example, when the bit size of the UCI is defined as A, A>[x] bits), the base station may instruct the transmission of the UCI on the xPUSCH.

As another example, the base station may determine whether the specific terminal does not have data to be transmitted on the uplink (condition 3). When the specific terminal needs to feed back the UCI information while having data to be transmitted on the uplink, the uplink data and the UCI are multiplexed and transmitted on the xPUSCH to efficiently use the uplink resource.

In addition, the base station may determine to transmit the UCI on the xPUSCH by combinations of two or more of the above-mentioned conditions (condition 1, condition 2, and condition 3).

Figure 5:
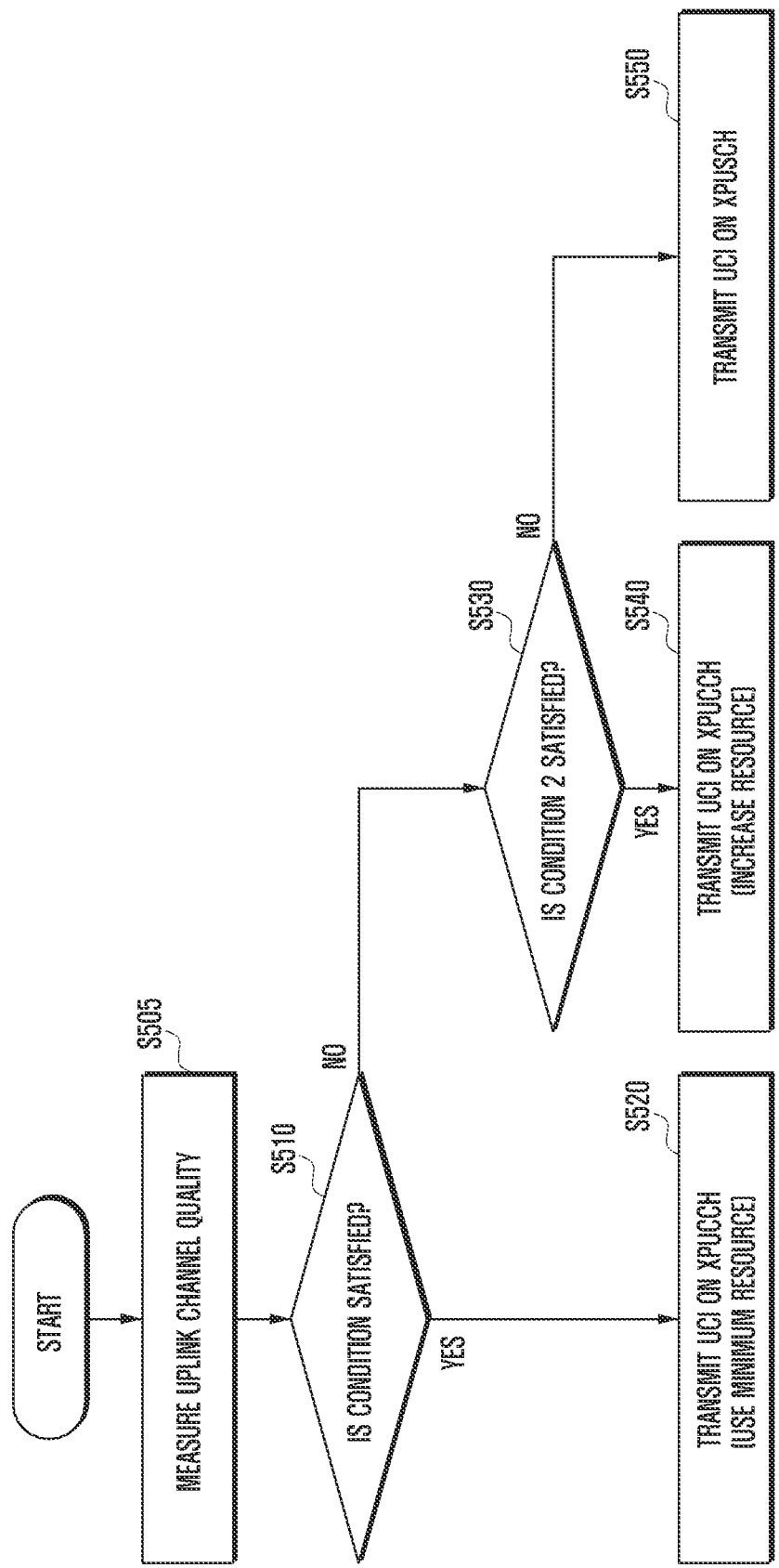
FIG. 5 is a diagram illustrating another operation of a base station for transmitting uplink control information according to an embodiment of the present disclosure.

FIG. 5 is a diagram illustrating another operation of a base station for transmitting uplink control information according to an embodiment of the present disclosure.

The base station may change the number of symbols of the xPUCCH according to the amount of UCI to be fed back by the terminal. That is, if the amount of UCI to be fed back by the terminal exceeds the first threshold, the base station may increase the number of symbols in the xPUCCH. If the amount of UCI to be fed back by the terminal exceeds the second threshold, the terminal can be set to transmit the UCI through the xPUSCH. The details are as follows.

The base station may measure the uplink channel quality in step S505. The base station may measure the uplink channel quality of the terminal by measuring the sounding reference signal (SRS) or the DMRS of the uplink xPUCCH or xPUSCH that the terminal transmits on the uplink. The base station may adjust the number of symbols of the xPUCCH that the terminal transmits subsequently.

The base station may determine whether the condition 1 is satisfied in step S510. In this case, the condition 1 may include a case in which the amount of UCI to be fed back by the terminal is smaller than or equal to the first threshold value ([x] bits) (A≤[X] bits).

If the condition 1 is satisfied, the base station may indicate the transmission of the UCI on xPUCCH in step S520. In this case, the xPUCCH may consist of a minimum resource or a minimum symbol. For example, if the amount of UCI is smaller than or equal to [x] bits, as the number of symbols of the xPUCCH for transmitting the UCI, one symbol may be used.

On the other hand, if the condition 1 is not satisfied, the base station can determine whether the condition 2 is satisfied in step S530. In this case, the condition 2 may include a case in which the amount of UCI to be fed back by the terminal is smaller than or equal to the second threshold value ([y] bits, in this case, y>x).

If the condition 2 is satisfied, the base station may indicate the transmission of the UCI on xPUCCH in step S540. At this time, the base station may increase the number of symbols of the xPUCCH.

For example, if the amount of UCI to be fed back by the terminal is equal to or greater than the first threshold value (A [X] bits) and equal to or smaller than the second threshold value (A≤[y] bits), the base station may increase the number of symbols of the xPUCCH for the UCI transmission to two. As described above, the base station may notify, through the DCI, whether the number of symbols of the xPUCCH is one or two.

If the condition 2 is not satisfied, the base station may indicate the UCI transmission through the xPUCCH in step S550.

For example, if the amount of UCI to be fed back by the terminal is greater than the second threshold value ([y] bits) (A>[y] bits, in this case, y>x), the base station may indicate the terminal to transmit the UCI on the xPUSCH.

The present example describes that the number of symbols of the xPUCCH is one or two, but the number of symbols is not limited thereto. That is, the minimum number of symbols of the xPUCCH may exceed one, and if the condition 2 is satisfied, the number of symbols of the xPUCCH may be set to be greater than two.

However, the conditions may be changed. For example, the conditions may be set for the coverage of the UCI. Therefore, the number of symbols of the xPUCCH can be adjusted according to the coverage (or required reception SINR of the xPUCCH) according to the coverage that the terminal transmits.

For example, if the coverage A of the UCI to be received from a particular terminal is equal to or smaller than the first threshold value ([x1] m) (A≤[X1] m) or if the required reception SINR B is equal to or smaller than the first threshold value [[y1] Db] (B≤[y1] Db) (condition 1), the base station may use one xPUCCH symbol to transmit the UCI. At this time, it is obvious that the first threshold value in the case of using the coverage and the first threshold value in the case of using the required reception SINR may be set differently.

Under the assumption, if the coverage of the UCI is greater than [x1] m (A>[x1] m) and the required SINR is greater than [y1] dB (B>[y1] dB), the base station may determine whether the condition 2 is satisfied.

If the condition 2 is satisfied, the base station increases the number of xPUCCH symbols for transmitting the UCI to two.

As described above, the base station may notify, through the DCI, whether the number of symbols of the xPUCCH is one or two.

The condition 2 is satisfied when the coverage of the UCI is smaller than the second threshold value ([x2] m) ((A<[x2] m) or the required SINR is smaller than the second threshold value ([y2] dB) (B<[y2] dB]). Meanwhile, if the coverage of the UCI is greater than [x2] m or the required SINR is greater than [y2] dB (in this case, x2>x1, y2>y1), the base station may indicate the terminal to transmit the UCI on the xPUSCH.

The present example describes that the number of symbols of the xPUCCH is one or two, but the number of symbols is not limited thereto.

Figure 6:
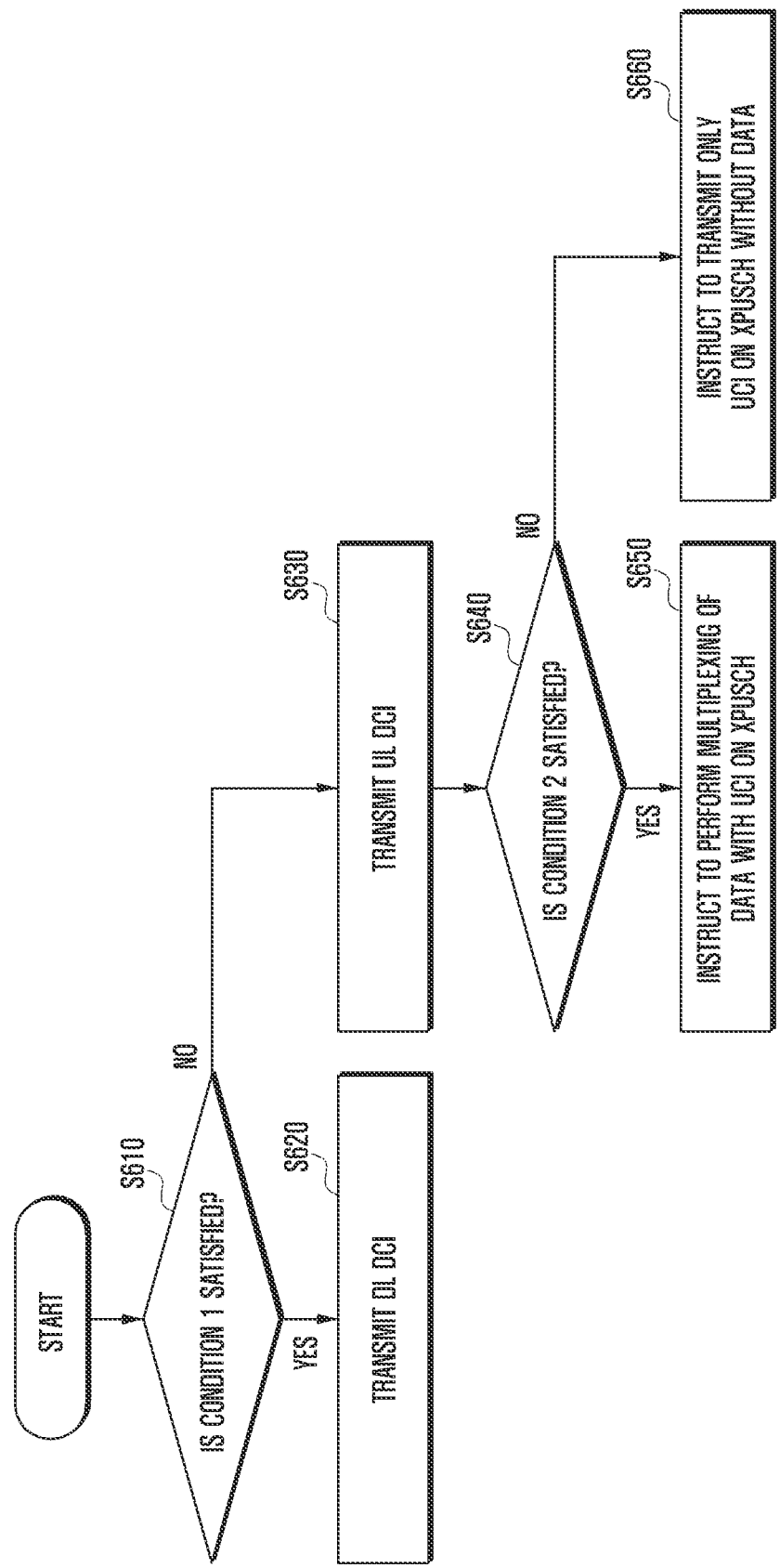
FIG. 6 is a diagram illustrating another operation of a base station for transmitting uplink control information according to an embodiment of the present disclosure.

FIG. 6 is a diagram illustrating another operation of a base station for transmitting uplink control information according to an embodiment of the present disclosure.

The base station can transmit the DCI to the terminal. At this time, the base station may determine whether to transmit the UL DCI or the DL DCI to the terminal.

Specifically, the base station may identify whether the condition 1 is satisfied in step S610.

If the condition 1 is satisfied, the base station may transmit the DL DCI in step S620. That is, the base station may perform triggering to allow the terminals satisfying the condition 1 to instruct the transmission of the UCI on the xPUCCH by the DL DCI. The information on time/frequency resources for transmitting the UCI on the xPUCCH may be included in the DL DCI.

At this time, the time resource information may include at least one of a symbol index (or the number of symbols), a slot index, or a subframe index of the xPUCCH on which the UCI is to be transmitted. Also, the frequency resource information may include the RB position and the number of RBs of the xPUCCH on which the UCI is to be transmitted.

The base station scheduler may determine whether the condition 1 is satisfied in consideration of the uplink channel state of the terminal feeding back the UCI information on the uplink, a payload size of the UCI information, or the like. That is, the base station may measure the uplink channel quality of the terminal by measuring the sounding reference signal (SRS) transmitted on the uplink or the DMRS of the uplink xPUCCH or the xPUSCH to determine the uplink channel state, and compare the UCI coverage with the threshold value to determine whether the condition 1 is satisfied. Alternatively, the base station may determine whether the condition 1 is satisfied using whether the requested SINR is greater than the first threshold value or whether the UCI payload size is greater than the first threshold value. For example, in the present disclosure, the condition 1 is satisfied when the UCI coverage, the required SINR, or the UCI payload size is smaller than the first threshold value. At this time, it is obvious that the first threshold value may be set differently for the UCI coverage, the required SINR, or the UCI payload size, respectively.

On the other hand, if the condition 1 is not satisfied, the base station may transmit the UL DCI in step S630. In this case, the base station may perform triggering to allow the terminals to instruct the transmission of the UCI on the xPUSCH by the UL DCI. The information on the time/frequency resources for transmitting the UCI or data on the xPUSCH may be included in the UL DCI.

In this case, when the base station performs triggering to allow the terminal to transmit the UCI through the xPUSCH of the n-th subframe, the base station may additionally indicate whether the UCI should be multiplexed with data to be transmitted on the xPUSCH or only the UCI should be transmitted on the xPUSCH without data. At this time, the base station may determine whether to multiplex data with the UCI based on the 1-bit indication of the DCI.

Specifically, the base station may determine whether the condition 2 is satisfied in step S640.

If the condition 2 is satisfied, the base station may indicate the multiplexing of data with the UCI and transmitting the multiplexed data and UCI on the xPUSCH in step S650.

On the other hand, if the condition 2 is not satisfied, the base station may indicate the transmission of only the UCI on the xPUSCH without data in step S660.

At this time, the condition 2 may be the same as described above. That is, the base station may determine whether the condition 2 is satisfied by comparing the UCI coverage, the required SINR, or the UCI payload size with the second threshold value.

For example, in the present disclosure, the condition 2 is satisfied when the UCI coverage, the required SINR, or the UCI payload size is smaller than the second threshold value.

At this time, it is obvious that the first threshold value may be set differently for the UCI coverage, the required SINR, or the UCI payload size, respectively.

For example, the terminal receives the DCI from the base station. The terminal receiving the DCI demodulates and decodes the DCI, and determines whether it is the UL DCI or the DL DCI based on the DCI format or the DCI Field. The detailed content is the same as above and therefore will be omitted below.

The terminal determining that it is the UL DCI determines whether or not information related to the UCI transmission (hereinafter, referred to as UCI transmission information) is included in the corresponding DCI. In this case, the UCI transmission information may include a time/frequency resource of an uplink data channel (xPUSCH) for transmitting the UCI. At this time, the time resource information of the xPUSCH may be the symbol index (Index) (or the number of symbols), the slot index, or the subframe index of the xPUSCH on which the UCI is to be transmitted.

On the other hand, the frequency resource information of the xPUSCH may include a location of the resource block (RB) and the number of RBs of the xPUSCH on which the UCI is to be transmitted.

If the DCI field includes the UCI transmission information, the terminal determines whether there is a 1-bit indication field indicating whether to transmit only UCI information without transmitting data or to multiplex the UCI with data information. If the terminal is indicated to transmit only the UCI information without transmitting data to the DCI Field, the terminal transmits only the UCI information on the xPUSCH. For example, when the 1-bit information is 1, it is indicated to transmit only the UCI information without transmitting data, and when it is 0, if it is assumed that it is indicated that data and the UCI information are multiplexed and transmitted, in the case in which the 1-bit indication is set to be 1, the terminal can transmit only the UCI information.

On the other hand, when the 1-bit information of the DCI field is set to be 0, the terminal multiplexes the UCI with data and transmits the multiplexed UCI and data on the xPUSCH. When the UCI is transmitted by being multiplexed with data, frequency resource information for transmitting the UCI in the UCI transmission information may be omitted. This is because the frequency resource information for the data transmission is the same as the frequency resource information for the UCI transmission.

Figure 7:
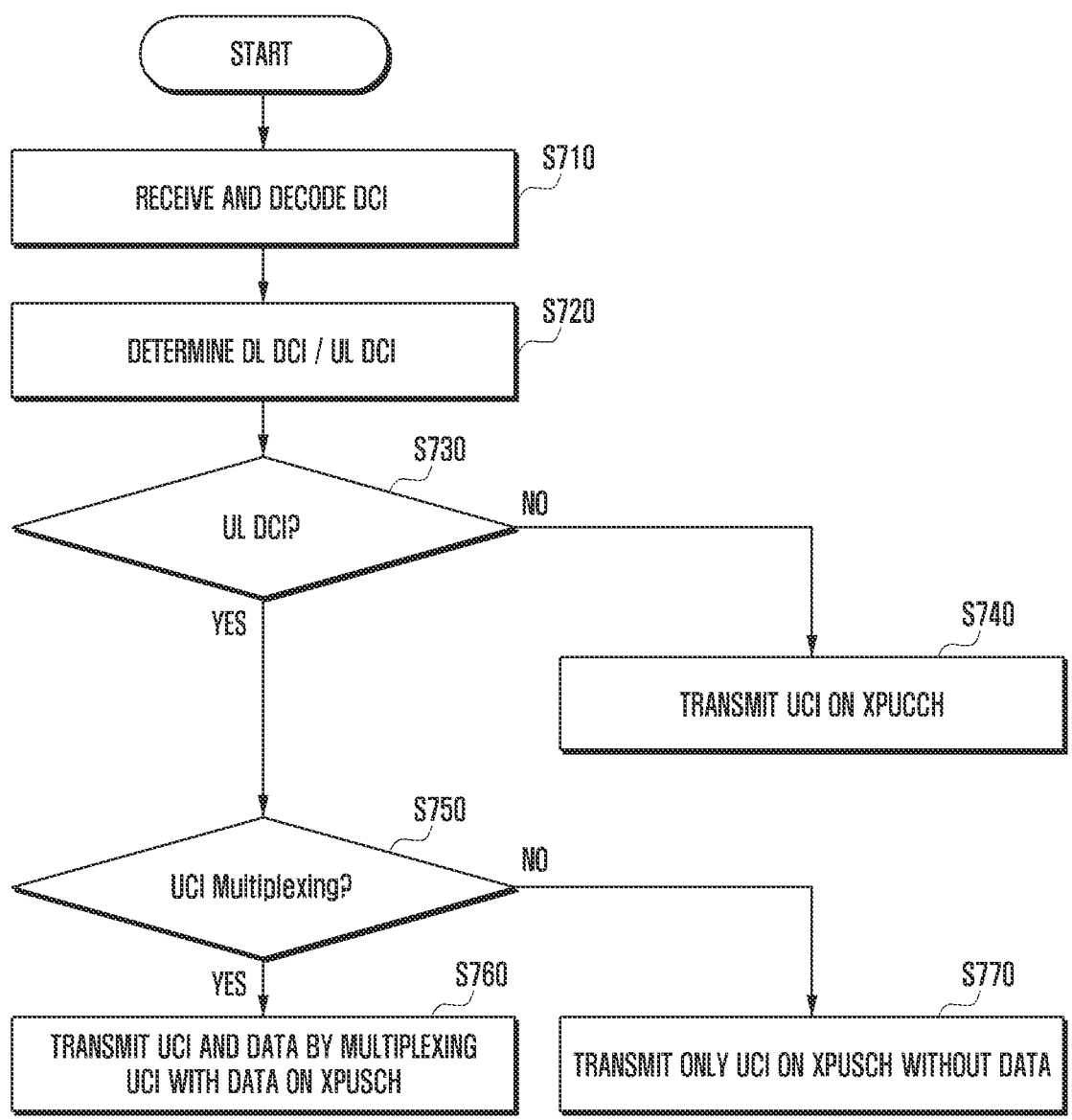
FIG. 7 is a diagram illustrating an operation of a terminal for transmitting uplink control information according to an embodiment of the present disclosure.

FIG. 7 is a diagram illustrating an operation of a terminal for transmitting uplink control information according to an embodiment of the present disclosure.

The terminal can receive the DCI transmitted by the base station in step S710 and decode the received DCI.

The terminal may determine whether the corresponding DCI is the DL DCI or the UL DCI in step S720, and determine whether the corresponding DCI is the UL DCI in step S730.

At this time, the terminal may determine whether the corresponding DCI is the DL DCI or the UL DCI based on the DCI format promised between the base station and the terminal or a specific field within the DCI.

For example, if the DCI is identified in the DCI format, the base station and the terminal need to be promised in advance that A bits are the DC DCI (DCI Format A) and B bits are the UL DCI (DCI Format B).

Otherwise, if the DCI is identified based on a specific field in the DCI, y bits constituting the MSB of the DCI Field consisting of x bits and y bits constituting the least significant bit of the DCI Field may indicate the DL DCI or the UL DCI. The size of y in the y bits described above may be different depending on the type of DCI supported by the system. For example, if the specific system supports four types of DCIs, then y=2, if it is '00', then it may mean UL DCI for single layer transmission of the xPUSCH, and if it is '01', it may mean UL DCI for multi-layer transmission of the xPUSCH. In addition, if it is '10', it may also mean DL DCI for single layer transmission of the xPDSCH and if it is '10', it may mean DL DCI for multi-layer transmission of the xPDSCH.

If the corresponding DCI is the DL DCI, the terminal may transmit the UCI on the xPUCCH in step S740.

If the corresponding DCI is the DL DCI, the terminal may transmit the UCI on the xPUSCH. At this time, the terminal can identify whether the UCI should be multiplexed with data and transmitted in step S750.

The terminal may additionally identify the 1-bit indication field of the UL DCI to identify this.

When the 1 bit information indicates the multiplexing of data with the UCI and the transmission of the multiplexed data and UCI, the terminal may multiplex the UCI with data and transmit the multiplexed UCI and data on the xPUSCH in step S760.

On the other hand, when the 1-bit information indicates the transmission of the UCI without the data, the terminal may transmit only the UCI on the xPDSCH in step S770.

Figure 8:
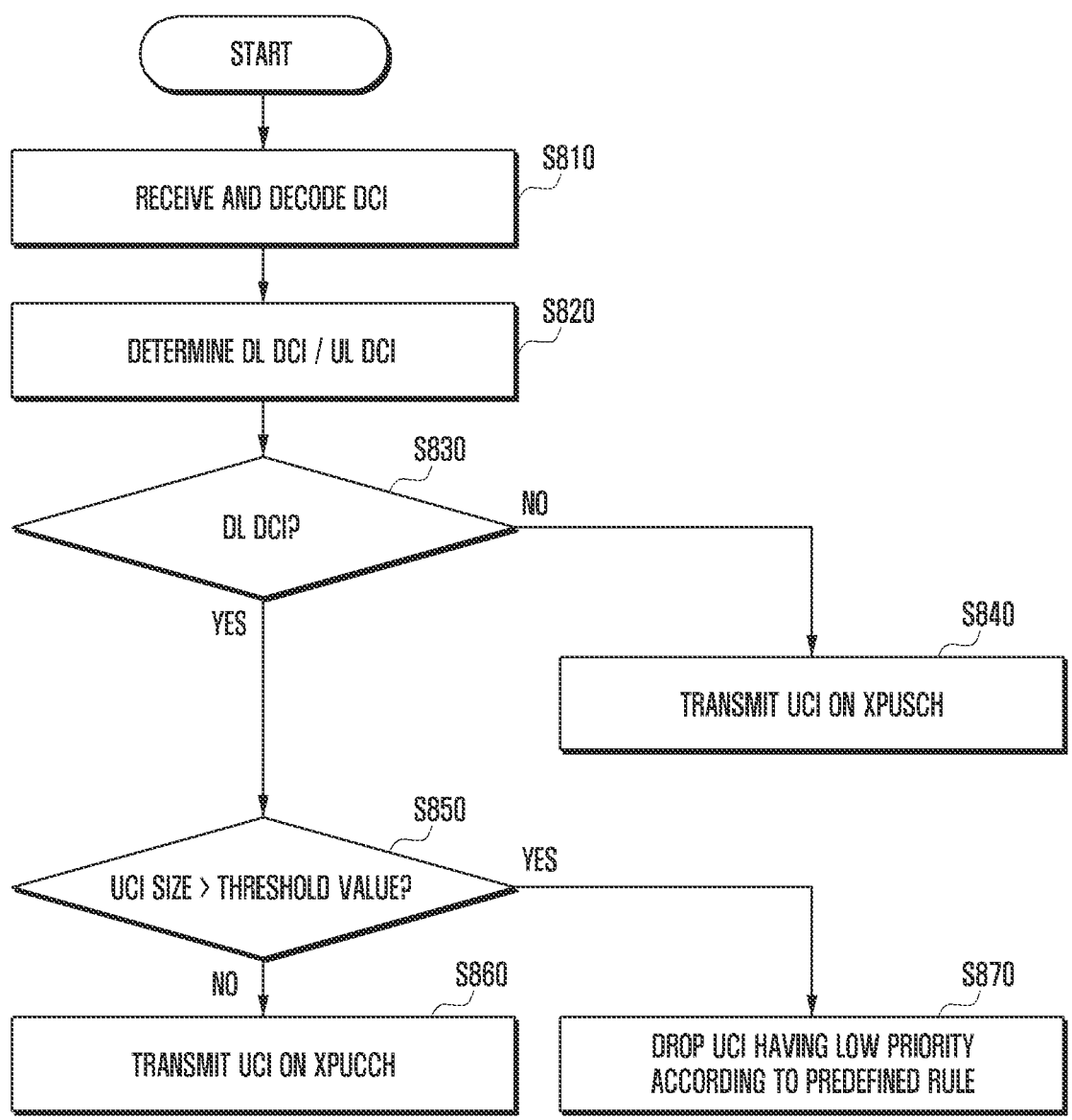
FIG. 8 is a diagram illustrating another operation of a terminal for transmitting uplink control information according to an embodiment of the present disclosure.

FIG. 8 is a diagram illustrating another operation of a terminal for transmitting uplink control information according to an embodiment of the present disclosure.

The terminal can receive the DCI transmitted by the base station in step S810 and decode the received DCI in step S810.

The terminal may determine whether the corresponding DCI is the DL DCI or the UL DCI in step S820, and determine whether the corresponding DCI is the UL DCI in step S830. This determination may be made based on the DCI format promised between the base station and the terminal, or may be made based on the specific field in the DCI as described above, and the detailed description thereof will be omitted.

If the corresponding DCI is the UL DCI, the terminal may transmit the UCI through the xPUSCH in step S840.

On the other hand, the terminal that has determined that the received DCI is a DL DCI may generate the UCI to be transmitted on the xPUCCH. At this time, since the xPUCCH uses less resources than the xPUSCH, there is a need to limit the UCI payload size that can be transmitted on the xPUCCH in order to increase the reception reliability of the UCI transmitted on the xPUCCH and guarantee the transmission coverage of the UCI.

Accordingly, the terminal may identify whether the payload size of the UCI is greater than a threshold (hereinafter, [x] bits) in step S850.

If the payload size is equal to or smaller than [x] bits, the terminal may transmit all UCI information on the xPUCCH in step S860.

On the other hand, if the payload size of the UCI is greater than [x] bits, the terminal may drop the UCI bits having low priority according to a rule promised between the base station and the mobile station in step S870. That is, the terminal may not transmit UCI bits having low priority. Priority information related to which information is not to be transmitted may be predefined by an appointment between the base station and the terminal, and may be, for example, an order of HARQ-ACK/NACK, Beam-related information (BI, BQI), CQI/PMI, and RI.

For example, if the threshold value is 22 bits and the HARQ-ACK/NACK information included in the UCI is 4 bits, the beam related information is 16 bits, the CQI/PMI is 6 bits, and the RI is 1 bit, the CQI/PMI and the RI may be dropped according to the priority.

Figure 9:
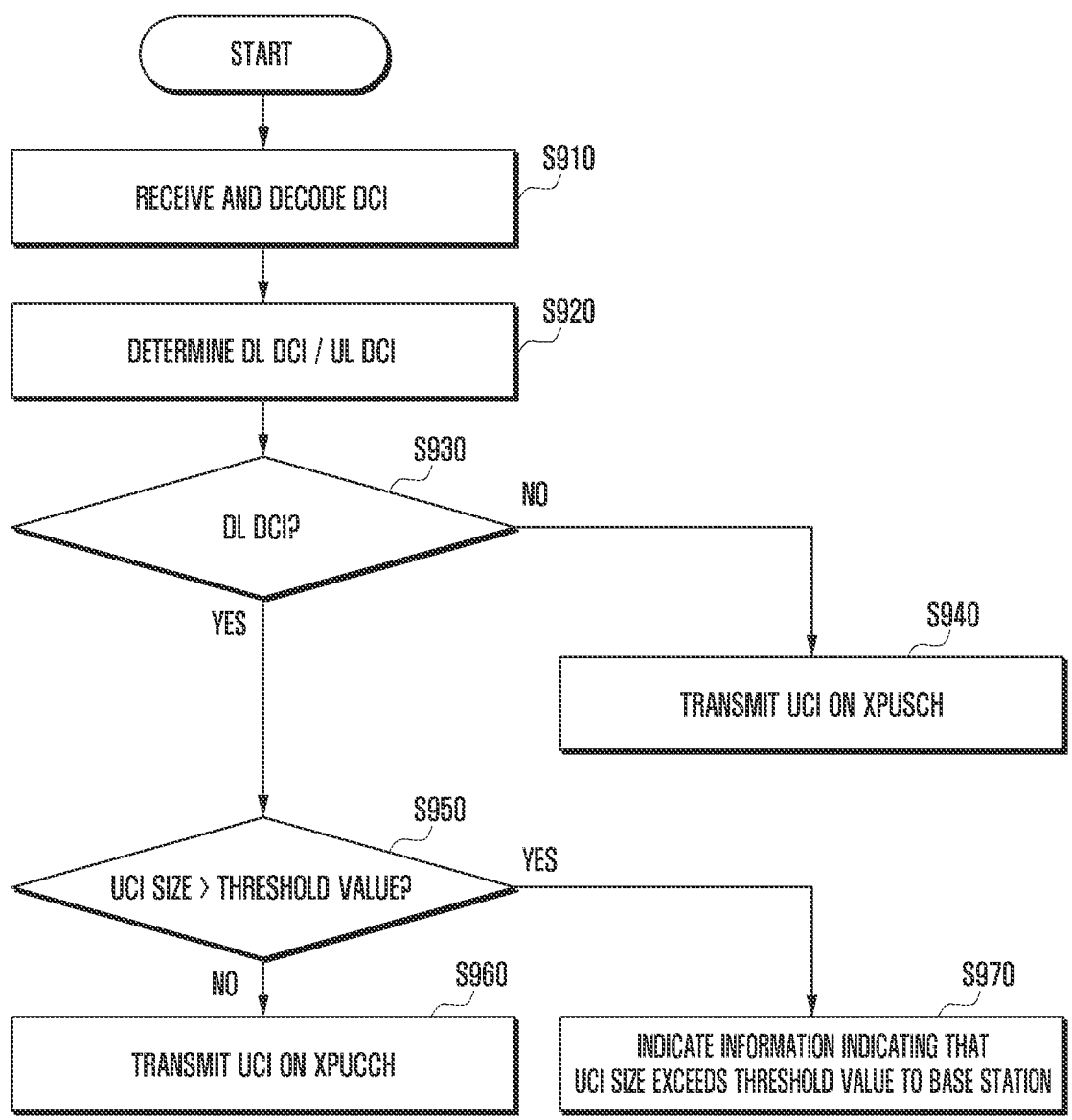
FIG. 9 is a diagram illustrating another operation of a terminal for transmitting uplink control information according to an embodiment of the present disclosure.

FIG. 9 is a diagram illustrating another operation of a terminal for transmitting uplink control information according to an embodiment of the present disclosure.

The terminal can receive the DCI transmitted by the base station in step S810 and decode the received DCI in step S910.

The terminal may determine whether the corresponding DCI is the DL DCI or the UL DCI in step S920, and identify whether the corresponding DCI is the UL DCI in step S930. This determination may be made based on the DCI format promised between the base station and the terminal, or may be made based on the specific field in the DCI as described above, and the detailed description thereof will be omitted.

If the corresponding DCI is the UL DCI, the terminal may transmit the UCI through the xPUSCH in step S940.

On the other hand, the terminal that has determined that the received DCI is a DL DCI may generate the UCI to be transmitted on the xPUCCH. At this time, since the xPUCCH uses less resources than the xPUSCH, when the UCI payload size exceeds the threshold value in order to increase the reception reliability of the UCI transmitted on the xPUCCH and guarantee the transmission coverage of the UCI, there is a need to increase the number of symbols of the xPUCCH.

Accordingly, the terminal may identify whether the payload size of the UCI is greater than a threshold (hereinafter, [x] bits) in step S950.

If the payload size of the UCI is equal to or smaller than [x] bits, the terminal may transmit all UCI information on the xPUCCH in step S960.

Differently from FIG. 8, when the payload size of the UCI generated by the terminal is greater than [x] bits, the terminal does not drop some UCI bits, but may transmit, to the base station, the information indicating that the UCI bits to be transmitted by the terminal are the maximum value ([x] bits). That is, in step S970, the terminal may transmit, to the base station, the information indicating that the UCI payload size exceeds the threshold value.

Accordingly, the base station receiving the same may allocate, to the terminal, additional xPUCCH time/frequency resources for transmission of the UCI bits exceeding the maximum value.

In another example, the base station receiving, from the terminal, the information indicating that the UCI bits exceed the maximum value ([x] bits) may instruct the terminal to transmit the UCI on the xPUSCH instead of the xPUCCH.

Meanwhile, the information that the terminal notifies the base station, that is, (the information indicating that the UCI size is equal to or greater than [x] bits) may be transmitted to a scheduling request (SR) or an RACH resource using a separate sequence or may be transmitted through an MAC control element (MAC CE) and an MAC payload.

Meanwhile, as described above, the UCI may include one or at least two of the scheduling request (SR), the HARQ-ACK/NACK, the rank indicator (RI), the channel quality information (CQI), the pre-coder matrix indicator (PMI), or the beam-related information (beam index and the received signal strength of the corresponding beam).

Also, in this example, the DL DCI may include the time/frequency resources for the xPUCCH transmission. More specifically, the terminal detects a specific DCI format, determines that the corresponding DCI is a DL DCI by referring to a specific field in the DCI, and obtains the time/frequency resource information of the xPUCCH. At this time, the time resource information of the xPUCCH may be the symbol index (Index) (or the number of symbols), the slot index, or the subframe index of the xPUCCH on which the UCI is to be transmitted. The frequency resource information of the xPUCCH may include the location of the resource block (RB) and the number of RBs of the xPUCCH on which the UCI is to be transmitted.

Also, in this example, the UL DCI may include the time/frequency resources for the xPUSCH transmission. More specifically, the terminal detects a specific DCI format, determines that the corresponding DCI is the UL DCI by referring to the specific field in the DCI, and obtains the time/frequency resource information of the xPUSCH. At this time, the time resource information of the xPUSCH may be the symbol index (Index) (or the number of symbols), the slot index, or the subframe index of the xPUSCH on which the UCI is to be transmitted. The frequency resource information of the xPUSCH may include the location of the resource block (RB) and the number of RBs of the xPUSCH on which the UCI is to be transmitted.

Meanwhile, the terminal measures a channel state information reference signal (CSI-RS) on which the base station transmits on the downlink and reports channel state information (CSI) to the base station through the uplink. The base station may determine a transmission mode (e.g., rank 1 transmission, rank 2 transmission, etc.) of the terminal using the CSI information reported from the terminal. Therefore, in order to support this operation, the base station needs to provide, to the terminal, the allocation information for the CSI-RS and the information on the time/frequency resources for the terminal to report the CSI. The following operations may be considered for this purpose.

Option 1: The CSI-RS allocation information is transmitted through the DL DCI, and the time/frequency resource information for the CSI reporting may be transmitted through the UL DCI. The terminal receiving the CSI-RS allocation information through the DL DCI performs the measurement on the CSI-RS and performs the CSI reporting using the time/frequency resource information designated by the UL DCI. In this method, when the CSI-RS measurement delay is different from the CSI reporting delay, which is a delay between the time when the base station triggers the CSI reporting and the time when the CSI is reported, it is possible to provide scheduling flexibility.

However, the signaling overhead may increase because the CSI reporting procedure is terminated when the terminal receives two different DCIs. Also, when the terminal misses one of the two DCIs, there is a problem that confusion may occur in the operations of the base station and the terminal.

Option 2: The CSI-RS allocation information and the time/frequency resource information for CSI reporting are transmitted through the same DCI (DL DCI or UL DCI).

The terminal receiving the DL DCI acquires the time resource information (i.e., the symbol index, the slot index, or the subframe index) and the frequency resource information (i.e., the location of the RB and the number of RBs) of the CSI-RS through the CSI-RS allocation information and then performs the CSI-RS measurement. As described above, upon receiving the DL DCI, when indicating the reporting of the UCI on the xPUCCH, the terminal knows that the CSI reporting should be transmitted on the xPUCCH, and acquires the time/frequency resource information for the xPUCCH transmission in the DL DCI to report the CSI measurement information measured by the terminal through the xPUCCH. However, it may be determined based on the above-described method whether report the UCI on the xPUCCH or the xPUSCH. When it is indicated that the CSI reporting is transmitted on the xPUSCH, the terminal may acquire the time/frequency resource information for the xPUSCH transmission to report the measured CSI measurement information through the xPUSCH.

Similarly, the terminal receiving the DL DCI acquires the time resource information (i.e., the symbol index, the slot index, or the subframe index) and the frequency resource information (i.e., the location of the RB and the number of RBs) of the CSI-RS through the CSI-RS allocation information and then performs the CSI-RS measurement. Upon receiving the UL DCI, when indicating the reporting of the UCI on the xPUSCH, the terminal knows that the CSI reporting should be transmitted on the xPUSCH, and acquires the time/frequency resource information for the xPUSCH transmission in the UL DCI to report the CSI measurement information measured by the terminal through the xPUCCH. However, it may be determined based on the above-described method whether report the UCI on the xPUCCH or the xPUSCH. When it is indicated that the CSI reporting is transmitted on the xPUCCH, the terminal may acquire the time/frequency resource information for the xPUCCH transmission to report the measured CSI measurement information through the xPUCCH.

Since this method performs the CSI-RS measurement and the CSI reporting through a single DCI, the problem (when the signaling overhead is increased and the terminal misses one of the two DCIs, confusion may occur in the operations of the base station and the terminal) of the Option 1 may be solved. However, if there is a difference between the delay required for the CSI-RS measurement of the terminal and the CSI reporting delay, the base station scheduler may be limited in flexibility.

Figure 10:
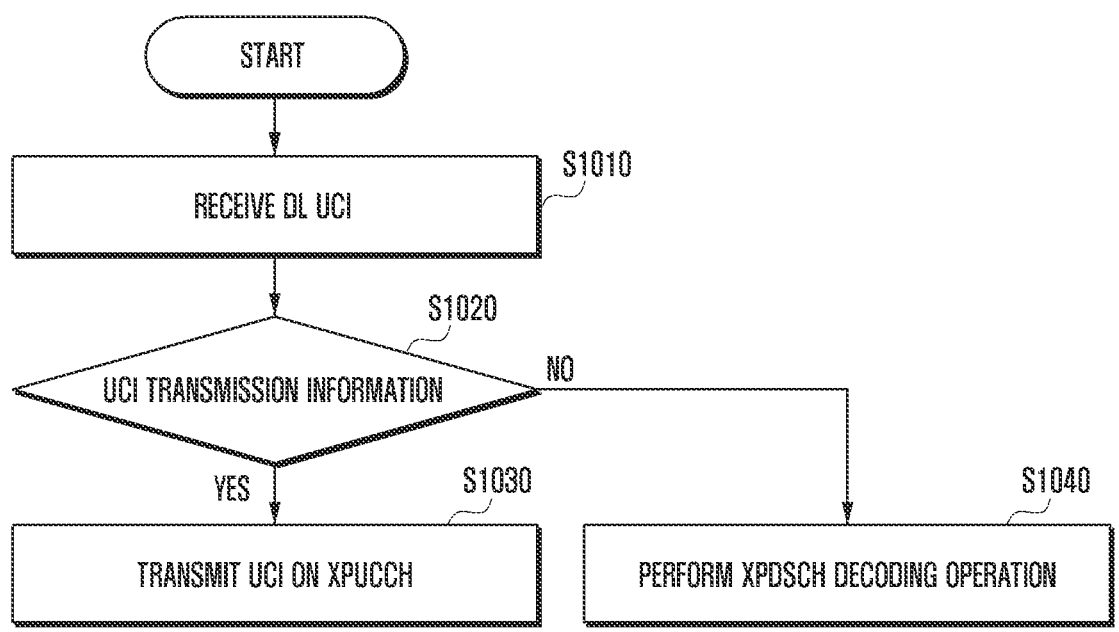
FIG. 10 is a diagram illustrating another operation of a terminal for transmitting uplink control information according to an embodiment of the present disclosure.

FIG. 10 is a diagram illustrating another operation of a terminal for transmitting uplink control information according to an embodiment of the present disclosure.

The terminal may receive the DL DCI from the base station in step S1010. The terminal receiving the same may demodulate and decode the DCI.

The terminal demodulates the DCI in step S1020, and identifies whether the DCI field includes the UCI transmission information.

If the UCI transmission information is included in the DCI field, the terminal transmits UCI to the base station through the xPUCCH in step S1030.

If the UCI transmission information is not included in the DCI field, the terminal performs the demodulation and decoding operations on the downlink data channel in step S1040.

In this case, as described above, the UCI transmission information may include the time/frequency resource of the uplink control channel (xPUSCH) for transmitting the UCI. At this time, the time resource information of the xPUCCH may be the symbol index (Index) (or the number of symbols), the slot index, or the subframe index of the xPUCCH on which the UCI is to be transmitted. On the other hand, the frequency resource information of the xPUCCH may include a location of the resource block (RB) and the number of RBs of the xPUCCH on which the UCI is to be transmitted.

Figure 11:
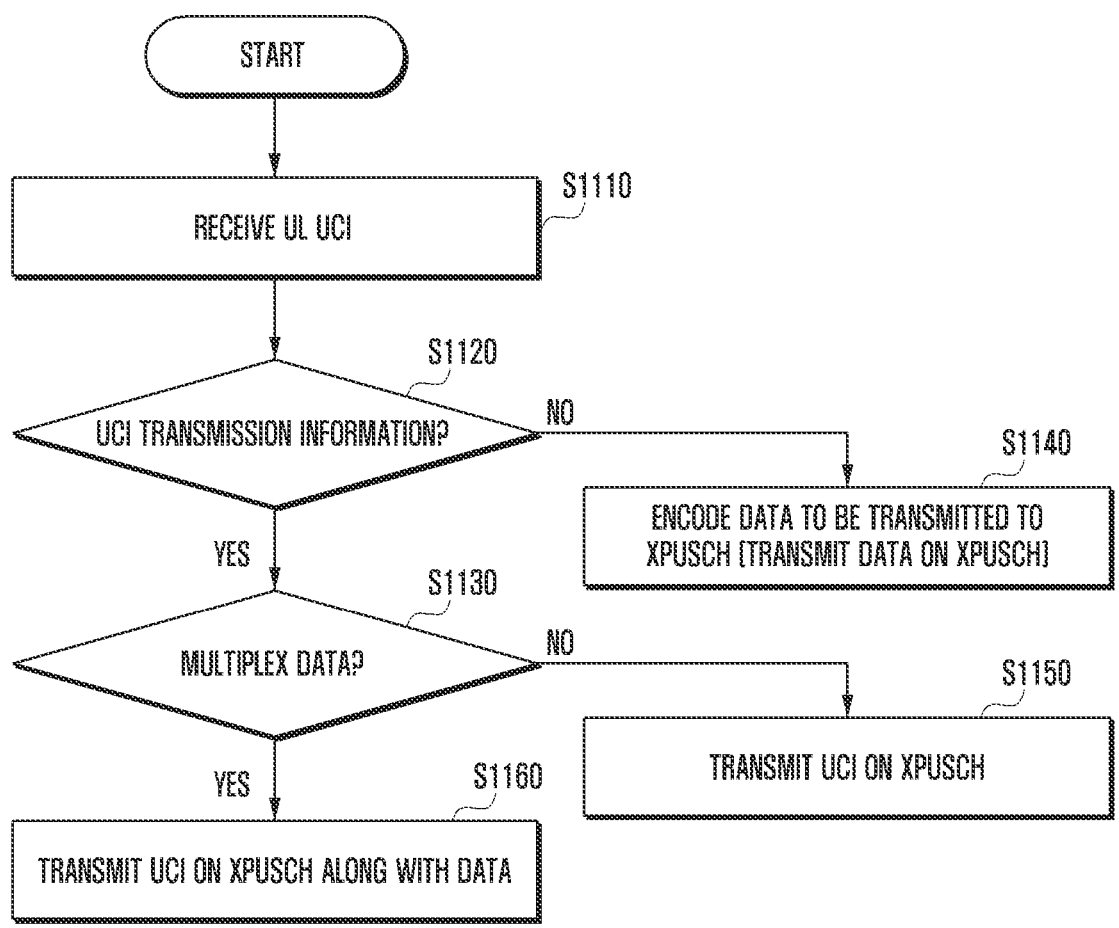
FIG. 11 is a diagram illustrating another operation of a terminal for transmitting uplink control information according to an embodiment of the present disclosure.

FIG. 11 is a diagram illustrating another operation of a terminal for transmitting uplink control information according to an embodiment of the present disclosure.

The terminal receives the UL DCI from the base station. The terminal receiving the same may demodulate and decode the DCI.

The terminal demodulates the DCI in step S1120, and identifies whether the DCI field includes the UCI transmission information.

In this case, the UCI transmission information may include a time/frequency resource of an uplink data channel (xPUSCH) for transmitting the UCI. At this time, the time resource information of the xPUSCH may be the symbol index (Index) (or the number of symbols), the slot index, or the subframe index of the xPUSCH on which the UCI is to be transmitted. On the other hand, the frequency resource information of the xPUSCH may include a location of the resource block (RB) and the number of RBs of the xPUSCH on which the UCI is to be transmitted.

Alternatively, if the UCI transmission information is not included in the UL DCI, the terminal may transmit data on the xPUSCH in step S1140. That is, the terminal may perform encoding of data to be transmitted on the xPUSCH.

If the DCI field includes the UCI transmission information, the terminal may identify whether or not to multiplex the UCI and the data information in step S1130. At this time, the terminal determines whether there is the 1-bit indication field indicating whether to transmit only UCI information without transmitting only the UCI information to the Field included in the received DCI without transmitting data or to multiplex the UCI with the data information.

If it is assumed that only the UCI information is transmitted to the DCI field without transmitting data (for example, '1'=transmission of only the UCI information without transmitting the data, '0'=if it is assumed that data and the UCI information are multiplexed, '1' is indicated), the terminal transmits only the UCI information on the xPUSCH in step S1150.

On the other hand, if '0' is indicated in the DCI field, the terminal multiplexes the UCI and data on the xPUSCH and transmits the multiplexed UCI and data in step S1160. When the UCI is transmitted by being multiplexed with data, frequency resource information for transmitting the UCI in the UCI transmission information may be omitted. This is because the frequency resource information for the data transmission is the same as the frequency resource information for the UCI transmission.

Figure 12:
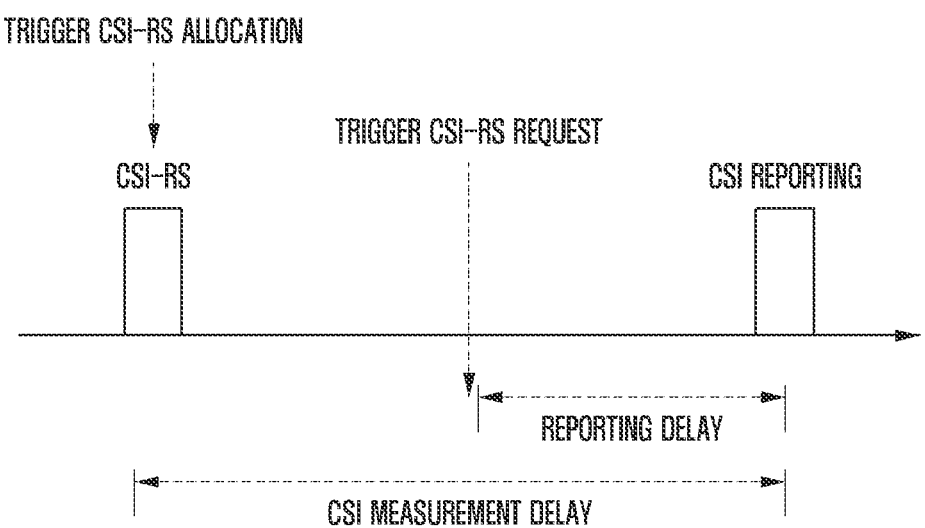
FIG. 12 is a diagram illustrating an operation of a terminal for a CSI measurement report according to an embodiment of the present disclosure.

FIG. 12 is a diagram illustrating an operation of a terminal for a CSI measurement report according to an embodiment of the present disclosure.

FIG. 12 shows an example in which the CSI-RS allocation information and the time/frequency resource information for the CSI reporting are transmitted through different DCIs.

More specifically, the CSI-RS allocation information is transmitted through the DL DCI, and the time/frequency resource information for the CSI reporting may be transmitted to the UL DCI.

The terminal may receive the DL DCI, and the DL DCI may include the CSI-RS allocation information. The terminal receiving the CSI-RS allocation information through the DL DCI may perform the measurement on the CSI-RS.

Also, the terminal may receive the UL DCI at a different time (or the same time) from the DL DCI, and the UL DCI may include the information for triggering the CSI reporting and the resource information for the CSI reporting. Therefore, the terminal performs the CSI report using the time/frequency resource information indicated by the UL DCI.

In this method, when the CSI-RS measurement delay between the time to measure the CSI-RS and the CSI-RS reporting time is different from the CSI reporting delay, which is a delay between the time when the base station triggers the CSI reporting and the time when the CSI is reported, it is possible to provide scheduling flexibility.

However, the signaling overhead may increase because the CSI reporting procedure is terminated when the terminal receives two different DCIs. Also, when the terminal misses one of the two DCIs, there is a problem that confusion may occur in the operations of the base station and the terminal.

Figure 13:
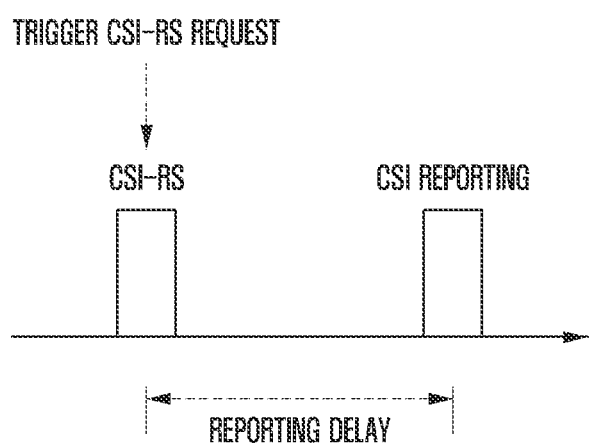
FIG. 13 is a diagram illustrating another operation of a terminal for a CSI measurement report according to an embodiment of the present disclosure.

FIG. 13 is a diagram illustrating another operation of a terminal for a CSI measurement report according to an embodiment of the present disclosure.

It indicates that the allocation information of the CSI-RS and the time/frequency resource information for the CSI reporting are transmitted through the same DCI.

More specifically, the CSI-RS allocation information and the time/frequency resource information for CSI reporting are transmitted through the same DCI (DL DCI or UL DCI).

For example, when the DL DCI is received, the DL DCI may include at least one of the CSI-RS allocation information, the information for triggering the CSI reporting, and the resource information for the CSI reporting.

The terminal receiving the DL DCI acquires the time resource information (i.e., the symbol index, the slot index, or the subframe index) and the frequency resource information (i.e., the location of the RB and the number of RBs) of the CSI-RS through the CSI-RS allocation information and then performs the CSI-RS measurement.

Upon receiving the DL DCI, when indicating the reporting of the CSI through the xPUCCH, the terminal knows that the CSI reporting should be transmitted on the xPUCCH, and acquires the time/frequency resource information for the xPUCCH transmission in the DL DCI to report the CSI measurement information measured by the terminal through the xPUCCH. However, the method of indicating whether to report the CSI through the xPUCCH or the xPUSCH may vary as described above, and when the DL DCI is received, it is possible to instruct the reporting of the CSI through the xPUSCH. In this case, the terminal may report the CSI using the resource information for reporting the CSI through the xPUSCH.

Similarly, when the UL DCI is received, the UL DCI may include at least one of the CSI-RS allocation information, the information for triggering the CSI reporting, and the resource information for the CSI reporting.

The terminal receiving the UL DCI acquires the time resource information (i.e., the symbol index, the slot index, or the subframe index) and the frequency resource information (i.e., the location of the RB and the number of RBs) of the CSI-RS through the CSI-RS allocation information and then performs the CSI-RS measurement.

Upon receiving the UL DCI, when indicating the reporting of the UCI on the xPUSCH, the terminal knows that the CSI reporting should be transmitted on the xPUSCH, and acquires the time/frequency resource information for the xPUSCH transmission in the UL DCI to report the CSI measurement information measured by the terminal through the xPUCCH. However, the method of indicating whether to report the CSI through the xPUCCH or the xPUSCH may vary as described above, and when the UL DCI is received, it is possible to instruct the reporting of the CSI through the xPUCCH. In this case, the terminal may report the CSI using the resource information for reporting the CSI through the xPUCCH.

Since this method performs the CSI-RS measurement and the CSI reporting through a single DCI, the problem (when the signaling overhead is increased and the terminal misses one of the two DCIs, confusion may occur in the operations of the base station and the terminal) of the Option 1 may be solved.

However, if there is a difference between the delay required for the CSI-RS measurement of the terminal and the CSI reporting delay, the base station scheduler may be limited in flexibility.

Figure 14:
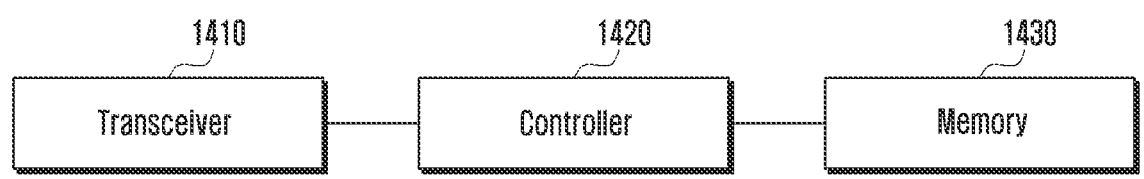
FIG. 14 is a diagram illustrating a structure of the terminal according to an embodiment of the present disclosure.

FIG. 14 is a diagram illustrating a structure of the terminal according to an embodiment of the present disclosure.

Referring to FIG. 14, the terminal may include a transceiver 1410, a controller 1420, and a memory 1430.

The transceiver 1410 may transmit and receive a signal to and from the base station, and may include an interface unit for it. For example, the transceiver 1410 may receive the DCI from the base station and may transmit the UCI or data to the base station.

The controller 1420 may control the operation of the terminal and may control the terminal to perform the operations described in the embodiment. Also, the controller 1420 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

Also, the controller 1420 may receive the DCI transmitted by the base station and decode the received DCI. The controller 1420 may determine whether the corresponding DCI is the DL DCI or the UL DCI, and determine whether the corresponding DCI is the UL DCI in step S730.

The controller 1420 may determine whether the corresponding DCI is the DL DCI or the UL DCI based on the DCI format promised between the base station and the terminal or the specific field within the DCI. The detailed content is the same as above and therefore will be omitted below.

If the corresponding DCI is the DL DCI, the controller 1420 may transmit the UCI on the xPUCCH.

If the corresponding DCI is the UL DCI, the controller 1420 may transmit the UCI on the xPUSCH. At this time, the controller can identify whether the UCI should be multiplexed with the data and transmitted.

The controller 1420 may additionally identify the 1-bit indication field of the UL DCI to identify this.

When the 1-bit information indicates the multiplexing of the data with the UCI and the transmission of the multiplexed data and UCI, the controller 1420 may multiplex the UCI with the data and transmit the multiplexed UCI and data on the xPUSCH.

On the other hand, when the 1-bit information indicates the transmission of the UCI without the data, the controller may transmit only the UCI on the xPDSCH.

In addition, when the received DCI is the DL DCI, the controller 1420 can identify whether the payload value of the UCI is generator than the threshold value. The controller 1420 may transmit all the UCIs on the xPUCCH when the payload of the UCI is equal to or smaller than the threshold value.

On the other hand, if the payload size of the UCI is greater than the threshold value, the controller 1420 may drop the UCI bits having low priority according to a rule promised between the base station and the terminal. That is, the controller 1420 may not transmit UCI bits having low priority. Priority information related to which information is not to be transmitted may be predefined by an appointment between the base station and the terminal, and may be, for example, an order of HARQ-ACK/NACK, Beam-related information (BI, BQI), RI, and CQI/PMI.

Alternatively, if the payload size of the UCI is greater than the threshold value, the controller 1420 does not drop some UCI bits but may transmit to the base station the information indicating that the UCI bits to be transmitted by the controller 1421 exceeds the maximum value ([x] bits).

The controller 1420 receives the downlink control information, identifies whether the DCI is the uplink DCI for the uplink or the downlink DCI for the downlink, and transmits the UCI through any one of the uplink control channel or the uplink data channel according to the identification result.

In addition, the controller 1420 may control all the operations of the UE described in the present disclosure.

The memory 1430 may store at least one of information transmitted/received through the transceiver. Further, the memory 1430 may store at least one of the information generated by the controller 1420.

Figure 15:
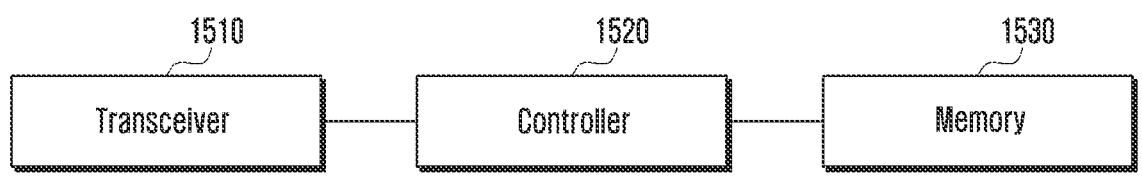
FIG. 15 is a diagram illustrating a structure of the base station according to an embodiment of the present disclosure.

FIG. 15 is a diagram illustrating a structure of the base station according to an embodiment of the present disclosure.

Referring to FIG. 15, the base station may include a transceiver 1510, a controller 1520, and a memory 1530.

The transceiver 1510 may transmit and receive a signal to and from the terminal, and may include an interface unit for it. For example, the transceiver 1510 may transmit the DCI to the terminal and may receive the UCI from the terminal.

The controller 1520 may control the operation of the base station and may control the base station to perform the operations described in the embodiment. Also, the controller 1520 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

The controller 1520 may transmit the DCI to the terminal. At this time, the base station may determine whether to transmit the UL DCI or the DL DCI to the terminal.

Specifically, the controller 1520 may identify whether the condition 1 is satisfied. At this time, the condition 1 is the same as described above, and is omitted in the following.

If the condition 1 is satisfied, the controller 1520 may transmit the DL DCI. That is, the controller 1520 may perform triggering to allow the terminals satisfying the condition 1 to instruct the transmission of the UCI on the xPUCCH by the DL DCI. The information on time/frequency resources for transmitting the UCI on the xPUCCH may be included in the DL DCI.

At this time, the time resource information may include at least one of a symbol index (or the number of symbols), a slot index, or a subframe index of the xPUCCH on which the UCI is to be transmitted. Also, the frequency resource information may include the RB position and the number of RBs of the xPUCCH on which the UCI is to be transmitted.

The base station scheduler may determine whether the condition 1 is satisfied in consideration of the uplink channel state of the terminal feeding back the UCI information on the uplink, a payload size of the UCI information, or the like.

On the other hand, if the condition 1 is not satisfied, the controller 1520 may transmit the UL DCI. In this case, the base station may perform triggering to allow the terminals to instruct the transmission of the UCI on the xPUSCH by the UL DCI. The information on the time/frequency resources for transmitting the UCI or the data on the xPUSCH may be included in the UL DCI.

In this case, when the controller 1520 performs triggering to allow the terminal to transmit the UCI through the xPUSCH of the n-th subframe, the controller 1520 may additionally indicate whether the UCI should be multiplexed with the data to be transmitted on the xPUSCH or only the UCI should be transmitted on the xPUSCH without data. At this time, the controller 1520 may determine whether to multiplex the data with the UCI based on the 1-bit indication of the DCI.

Specifically, the controller 1520 may identify whether the condition 2 is satisfied. At this time, the condition 2 is the same as described above, and is omitted in the following.

If the condition 2 is satisfied, the controller 1520 may indicate the multiplexing of the data with the UCI and the transmission of the multiplexed data and UCI on the xPUSCH. On the other hand, if the condition 2 is not satisfied, the controller 1520 may indicate transmitting only the UCI on the xPUSCH without data.

In addition, the controller 1520 may generate the DCI, transmits the DCI to the terminal, and receive the UCI through any one of the uplink control channel and the uplink data channel according to whether the DCI is the uplink DCI for the uplink or the downlink DCI for the downlink.

In addition, the controller 1520 may control all the operations of the base station described in the present disclosure.

The memory 1530 may store at least one of information transmitted and received through the transceiver. Further, the memory 1530 may store at least one of the information generated by the controller 1520.

Meanwhile, although the embodiments of the present disclosure have been illustrated in the present specification and the accompanying drawings and specific terms have been used, they are used in a general meaning in order to assist in the understanding the present disclosure and do not limit the scope of the present disclosure. It is obvious to those skilled in the art to which the present disclosure pertains that various modifications may be made without departing from the scope of the present disclosure, in addition to the embodiments disclosed herein.

What is claimed is:

1. A method performed by a terminal in a communication system, the method comprising:
   receiving, from a base station, a physical uplink control channel (PUCCH) configuration through radio resource control (RRC) signaling, wherein the PUCCH configuration includes indices of PUCCH resources and information indicating whether hybrid automatic repeat request (HARQ) acknowledgement (ACK) information and channel state information (CSI) are transmitted in a same PUCCH resource;

receiving, from the base station, downlink control information (DCI) including information indicating a PUCCH resource among the PUCCH resources; and transmitting, to the base station, uplink control information (UCI) including the HARQ ACK information and the CSI on the PUCCH resource based on the information indicating that the HARQ ACK information and the CSI being transmitted in the same PUCCH resource is configured.

2. The method of claim 1, wherein a portion of the UCI is not transmitted, in case that a bit length of the UCI is larger than a specific value.

3. The method of claim 1, wherein the PUCCH configuration includes a set of frequency resources of the PUCCH resources.

4. The method of claim 1, wherein the DCI includes information on a time resource of the PUCCH resource.

5. A method performed by a base station in a communication system, the method comprising:

transmitting, to a terminal, a physical uplink control channel (PUCCH) configuration through radio resource control (RRC) signaling, wherein the PUCCH configuration includes indices of PUCCH resources and information indicating whether hybrid automatic repeat request (HARQ) acknowledgement (ACK) information and channel state information (CSI) are transmitted in a same PUCCH resource;

transmitting, to the terminal, downlink control information (DCI) including information indicating a PUCCH resource among the PUCCH resources; and receiving, from the terminal, uplink control information (UCI) including the HARQ ACK information and the CSI on the PUCCH resource based on the information indicating that the HARQ ACK information and the CSI being transmitted in the same PUCCH resource is configured.

6. The method of claim 5, wherein a portion of the UCI is not received, in case that a bit length of the UCI is larger than a specific value.

7. The method of claim 5, wherein the PUCCH configuration includes a set of frequency resources of the PUCCH resources.

8. The method of claim 5, wherein the DCI includes information on a time resource of the PUCCH resource.

9. A terminal in a communication system, the terminal comprising:

a transceiver; and a controller coupled with the transceiver and configured to:

receive, from a base station, a physical uplink control channel (PUCCH) configuration through radio resource control (RRC) signaling, wherein the PUCCH configuration includes indices of PUCCH resources and information indicating whether hybrid automatic repeat request (HARQ) acknowledgement (ACK) information and channel state information (CSI) are transmitted in a same PUCCH resource, receive, from the base station, downlink control information (DCI) including information indicating a PUCCH resource among the PUCCH resources, and transmit, to the base station, uplink control information (UCI) including the HARQ ACK information and the CSI on the PUCCH resource based on the information indicating that the HARQ ACK information and the CSI being transmitted in the same PUCCH resource is configured.

10. The terminal of claim 9, wherein a portion of the UCI is not transmitted, in case that a bit length of the UCI is larger than a specific value.

11. The terminal of claim 9, wherein the PUCCH configuration includes a set of frequency resources of the PUCCH resources.

12. The terminal of claim 9, wherein the DCI includes information on a time resource of the PUCCH resource.

13. A base station in a communication system, the base station comprising:

a transceiver; and a controller coupled with the transceiver and configured to:

transmit, to a terminal, a physical uplink control channel (PUCCH) configuration through radio resource control (RRC) signaling, wherein the PUCCH configuration includes indices of PUCCH resources and information indicating whether hybrid automatic repeat request (HARQ) acknowledgement (ACK) information and channel state information (CSI) are transmitted in a same PUCCH resource, transmit, to the terminal, downlink control information (DCI) including information indicating a PUCCH resource among the PUCCH resources, and receive, from the terminal, uplink control information (UCI) including the HARQ ACK information and the CSI on the PUCCH resource based on the information indicating that the HARQ ACK information and the CSI being transmitted in the same PUCCH resource is configured.

14. The base station of claim 13, wherein a portion of the UCI is not received, in case that a bit length of the UCI is larger than a specific value.

15. The base station of claim 13, wherein the PUCCH configuration includes a set of frequency resources of the PUCCH resources.

16. The base station of claim 13, wherein the DCI includes information on a time resource of the PUCCH resource.

* * * * *